US012608629B2

(12) United States Patent
Phillips et al.

(10) Patent No.: US 12,608,629 B2
(45) Date of Patent: Apr. 21, 2026

(54) CONTENT GENOME GENERATION AND MANAGEMENT SYSTEM IN A MULTI-MODAL ARTIFICIAL INTELLIGENCE SYSTEM FOR MEDIA ASSETS

(71) Applicant: Spherex, Inc., Santa Clara, CA (US)

(72) Inventors: Teresa Ann Phillips, Los Altos, CA (US); Pranav Anand Joshi, Cerritos, CA (US)

(73) Assignee: SPHEREX, INC., Santa Clara, CA (US)

( * ) Notice: Subject to any disclaimer, the term of this patent is extended or adjusted under 35 U.S.C. 154(b) by 997 days.

(21) Appl. No.: 17/305,383

(22) Filed: Jul. 6, 2021

(65) Prior Publication Data

US 2023/0010938 A1     Jan. 12, 2023

(51) Int. Cl.
| | |
|---|---|
| *G06N 5/04* | (2023.01) |
| *A01K 29/00* | (2006.01) |
| *G06N 20/00* | (2019.01) |

(52) U.S. Cl.
CPC ............... *G06N 5/04* (2013.01); *A01K 29/00* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | |
|---|---|---|---|
| 8,516,374 B2 | 8/2013 | Fleischman et al. | |
| 8,856,051 B1 * | 10/2014 | Song ...................... | G06N 20/00 706/12 |

| | | | |
|---|---|---|---|
| 10,055,853 B1 | 8/2018 | Fisher et al. | |
| 10,445,668 B2 | 10/2019 | Oehrle et al. | |
| 10,474,717 B2 | 11/2019 | Quennesson | |
| 10,516,902 B1 * | 12/2019 | Manoria .......... | H04N 21/23418 |

(Continued)

FOREIGN PATENT DOCUMENTS

| | | | |
|---|---|---|---|
| KR | 20140158441 A | * | 11/2014 |
| WO | WO-2009109976 A2 | | 9/2009 |
| WO | 2023282958 | | 11/2022 |

OTHER PUBLICATIONS

Bagaria, Venkatesh (Oct. 12, 2020), "Amazon Rekognition adds support for six new content moderation categories," AWS Blog (Year: 2020).*

(Continued)

*Primary Examiner* — David Yi

(74) *Attorney, Agent, or Firm* — SCHWEGMAN LUNDBERG & WOESSNER, P.A.

(57) ABSTRACT

Various embodiments described herein support or provide for content genome generation and management operations of a media asset, such as accessing content data of a media asset and a set of input cues associated with the media asset; identifying a set of elements based on the content data of the media asset and the set of input cues; assigning a set of weight values to the set of elements based on a priority rule; identifying one or more relevant elements from the set of elements based on a ranking of the set of weight values; analyzing the one or more relevant elements to generate a set of classified features based on a set of tags; and using a machine learning algorithm to generate a content genome of the media asset based on the set of classified features.

10 Claims, 13 Drawing Sheets

(56)　　　　　References Cited

U.S. PATENT DOCUMENTS

| 10,643,074 | B1 | 5/2020 | Mcaninly et al. | |
|---|---|---|---|---|
| 10,848,791 | B1 | 11/2020 | Germano et al. | |
| 10,897,649 | B1 | 1/2021 | Germano et al. | |
| 10,897,658 | B1 | 1/2021 | Sethu et al. | |
| 2009/0234831 | A1* | 9/2009 | Ebadollahi | G06Q 30/0201 |
| | | | | 707/999.005 |
| 2013/0257871 | A1* | 10/2013 | Goldstein | G11B 27/034 |
| | | | | 345/440 |
| 2015/0206062 | A1* | 7/2015 | Xiong | G06F 16/353 |
| | | | | 706/12 |
| 2016/0100226 | A1* | 4/2016 | Sadler | H04N 21/454 |
| | | | | 725/38 |
| 2017/0017644 | A1* | 1/2017 | Accardo | G06F 16/285 |
| 2017/0133054 | A1* | 5/2017 | Song | G11B 27/28 |
| 2018/0035938 | A1 | 2/2018 | El Kaliouby et al. | |
| 2018/0287976 | A1* | 10/2018 | Hochstein | H04W 4/18 |
| 2019/0294690 | A1* | 9/2019 | Pastor | G06F 16/435 |
| 2019/0373297 | A1* | 12/2019 | Sarkhel | H04N 21/25841 |
| 2020/0005046 | A1* | 1/2020 | Attorre | G06T 7/0002 |
| 2020/0021873 | A1* | 1/2020 | Swaminathan | H04N 21/466 |
| 2020/0275158 | A1* | 8/2020 | Gaur | G06N 3/08 |
| 2020/0366959 | A1* | 11/2020 | Pau | G06N 20/00 |
| 2022/0207864 | A1* | 6/2022 | Autès | G06V 10/82 |
| 2022/0248090 | A1* | 8/2022 | Dhiman | H04N 21/4318 |
| 2022/0382806 | A1* | 12/2022 | Liberty | G06F 16/685 |

OTHER PUBLICATIONS

"International Application Serial No. PCT US2022 025679, International Preliminary Report on Patentability mailed Jan. 18, 2024", 8 pgs.

"European Application Serial No. 22838184.4, Response filed Feb. 27, 2024 to Communication pursuant to Rules 161(1) and 162 EP", 17 pgs.

"International Application Serial No. PCT US2022 025679, International Search Report mailed Aug. 24, 2022", 2 pgs.

"International Application Serial No. PCT US2022 025679, Written Opinion mailed Aug. 24, 2022", 6 pgs.

"Australian Application Serial No. 2022306844, First Examination Report mailed Jan. 31, 2025", 13 pgs.

"European Application Serial No. 22838184.4, Extended European Search Report mailed Mar. 26, 2025", 7 pgs.

"Australian Application Serial No. 2022306844, Response filed May 13, 2025 to First Examination Report mailed Jan. 31, 2025", w/ claims, 20 pgs.

"European Application Serial No. 22838184.4, Extended European Search Report mailed Mar. 26, 2025", 11 pages.

* cited by examiner

400

ACCESS CONTENT DATA OF MEDIA ASSET — 402

IDENTIFY ELEMENT(S) BASED ON CONTENT DATA AND INPUT CUE(S) — 404

ASSIGN WEIGHT VALUE(S) TO ELEMENT(S) — 406

IDENTIFY RELEVANT ELEMENT(S) BASED ON RANKING OF WEIGHT VALUE(S) — 408

ANALYZE RELEVANT ELEMENTS TO GENERATE CLASSIFIED FEATURE(S) — 410

GENERATE CONTENT GENOME(S) BASED ON CLASSIFIED FEATURE(S) — 412

IDENTIFY RELEVANT EVENT(S) BASED ON CONTENT GENOME(S) — 414

500

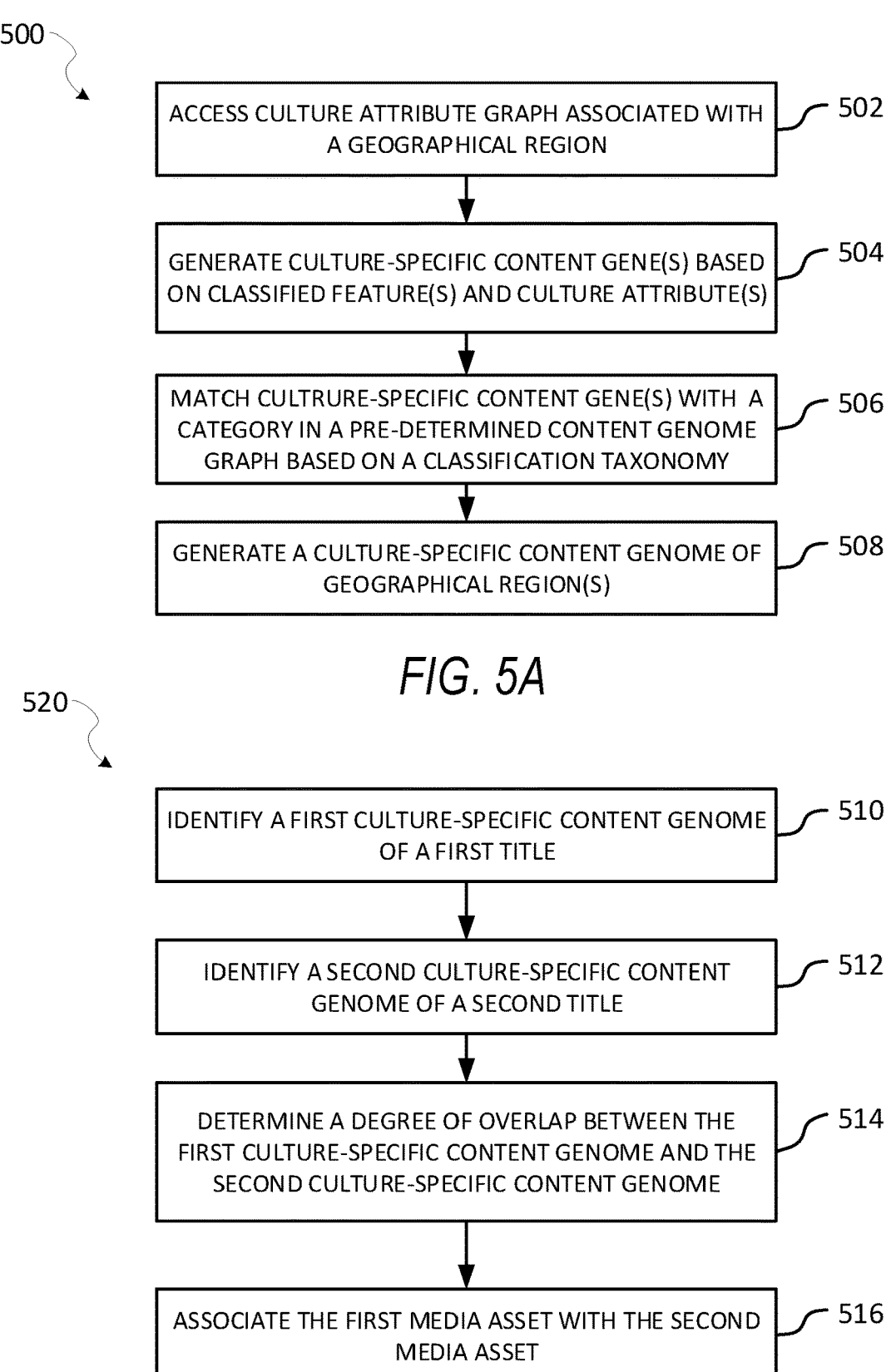

ACCESS CULTURE ATTRIBUTE GRAPH ASSOCIATED WITH A GEOGRAPHICAL REGION ⌐ 502

GENERATE CULTURE-SPECIFIC CONTENT GENE(S) BASED ON CLASSIFIED FEATURE(S) AND CULTURE ATTRIBUTE(S) ⌐ 504

MATCH CULTRURE-SPECIFIC CONTENT GENE(S) WITH A CATEGORY IN A PRE-DETERMINED CONTENT GENOME GRAPH BASED ON A CLASSIFICATION TAXONOMY ⌐ 506

GENERATE A CULTURE-SPECIFIC CONTENT GENOME OF GEOGRAPHICAL REGION(S) ⌐ 508

IDENTIFY A FIRST CULTURE-SPECIFIC CONTENT GENOME OF A FIRST TITLE ⌐ 510

IDENTIFY A SECOND CULTURE-SPECIFIC CONTENT GENOME OF A SECOND TITLE ⌐ 512

DETERMINE A DEGREE OF OVERLAP BETWEEN THE FIRST CULTURE-SPECIFIC CONTENT GENOME AND THE SECOND CULTURE-SPECIFIC CONTENT GENOME ⌐ 514

ASSOCIATE THE FIRST MEDIA ASSET WITH THE SECOND MEDIA ASSET ⌐ 516

*FIG. 5B*

CONTENT GENOME GENERATION AND MANAGEMENT SYSTEM IN A MULTI-MODAL ARTIFICIAL INTELLIGENCE SYSTEM FOR MEDIA ASSETS

TECHNICAL FIELD

The present disclosure generally relates to media assets, and, more particularly, various embodiments described herein provide for systems, methods, techniques, instruction sequences, and devices that facilitate generation and management of content genomes for a media asset, such as an audio asset or a video asset.

BACKGROUND

The Media and Entertainment industry is experiencing unprecedented global growth in content creation, distribution, and consumption. Film and television content created in one country can now seek distribution in over two hundred countries and territories and can be enjoyed by consumers representing thousands of cultures and sub-cultures. With wider access to so many new consumers, it is no surprise that the number of media assets and the associated titles released annually is growing exponentially, but this rapid growth makes it difficult for humans alone to accurately and consistently assess and prepare each media asset and the associated title for global distribution. Additionally, the simultaneous and exponential growth of film and television, streaming platforms, and global audiences is creating a burden and challenge that has never existed before. This pace of growth cannot be sustained without technological innovation.

Finding solutions to these challenges not only requires deep domain expertise in the Media and Entertainment industry, but also requires a thorough analysis of the content of media assets, a deep understanding of the cultures and complexities of the global regulatory environment, as well as a vision for how to properly engineer and train machine learning and artificial intelligence systems. All of these factors may help reduce bias, improve efficiency, ensure public safety, recognize cultural and religious norms, accelerate time-to-market, and recommend culturally relevant content to customers of particular cultural background and interests.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of examples, and not limitations, in the accompanying figures.

FIGS. 5A and 5B are flowcharts illustrating an example method for generating and managing content genomes for media assets, according to various embodiments of the present disclosure.

DETAILED DESCRIPTION

Figure 1:
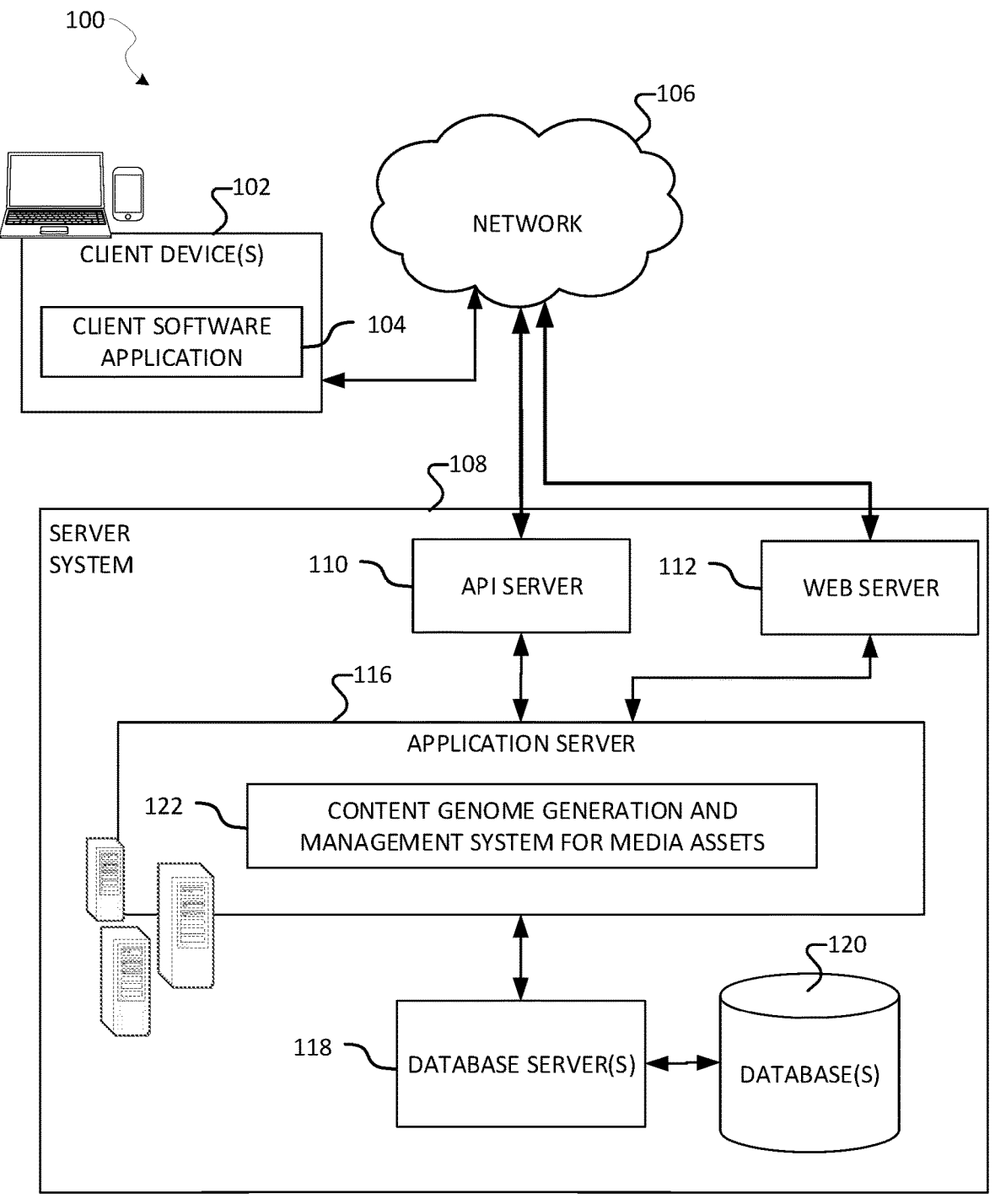
FIG. 1 is a block diagram showing an example data system that includes a content genome generation and management system in a multi-modal artificial intelligence system for media assets, according to various embodiments of the present disclosure.

Machine learning ("ML") and artificial intelligence ("AI") technologies face significant challenges in the Media & Entertainment industry when it comes to content interpretability, explainability, and bias. Interpretability can be the observation of cause and effect within the system. In other words, it describes the "What" aspect of the results. Explainability can refer to the "Why" aspect of an outcome and provides reasoning as to why the system generates results in a certain way. Explainability in AI systems can be crucial in providing insights into the data and decision points applied for prediction or recommendation. Bias in AI systems can be defined as the concept of observing outcomes that are consistently and systematically prejudiced due to incorrect assumptions. In global media asset distribution and content recommendation systems, bias can arise from the choice of training data that lack a comprehensive, up-to-date, and balanced cultural context.

Various embodiments described herein address these and other deficiencies of conventional art. Compared to a uni-modal architecture that is capable of processing a single type of mode (also referred to as content signal or element as described herein), a content genome generation and management system in the multi-modal architecture (e.g., a multi-modal artificial intelligence system) for media assets, as described herein, adds a greater level of data complexity by analyzing multiple modes (multi-modal) as data inputs using artificial intelligence technologies. Such multi-modal process and analytics capabilities provide the system with more dimensions of content signals (e.g., elements) when determining emotional or flaggable events and content characteristics (e.g., content genes, collectively representing a content genome) of media assets. Further, the solution provided by the multi-modal architecture integrates video understanding and cultural understanding into the content analysis processes for media assets and provides a deeper and more comprehensive understanding of the content of media assets for downstream analysis and utilities, such as global distribution and content recommendation. An emotional or flaggable event can refer to an event that has the possibility of invoking an emotional response in an audience member who observes or experiences the event. As discussed herein, a multi-modal architecture is used interchangeably with a multi-modal artificial intelligence (AI) system that includes the content genome generation and management system.

In various embodiments, a multi-modal architecture for media assets using machine learning frameworks, including a content genome generation and management system, as described in various embodiments of the present disclosure, provides for comprehensive analysis of a number of content signals (e.g., elements) at each given timestamp, and for generation of content genomes for a media or a title of the media asset based on cultural attributes specific to respective geographical regions. Content signals may include, at each given timestamp, visual elements, audio elements, text elements, and content-associated metadata. For example, a media asset, such as a movie, may comprise a number of events or time intervals that each comprises an audio element (e.g., music, dialog, background noise, etc.), a visual element (e.g., video, visual effects, colors, etc.), a textual element (e.g., subtitles, captions, etc.), or a combination thereof, that occurs within (e.g., is presented by) content of a media asset at a particular point on a timeline (e.g., a particular timestamp or timecode). In addition to captions and subtitles, text elements may also include text input by viewers while watching a video. Such text inputs are associated with timestamps and can be displayed at the respective timestamps on the screen of a display device during playback of the media asset. Captions may be a text version of the spoken part of a video, including but not limited to a television, movie, or computer presentation. Subtitles may be translations of the original language of a video when it is produced or created. Content-associated metadata may include genres, metadata taglines, descriptive keywords, online encyclopedia entries, and third-party reviews or comments of the media asset.

In various embodiments, a content genome (or content fingerprint) for media assets can comprise data (e.g., instruction code) that uniquely identifies and organizes emotional or flaggable events in view of cultural attributes associated with a geographical region where the media assets may be released. Content genomes serve as a set of instruction codes representing a unique fingerprint of media content specific to relevant geographical regions, and may be used to organize, index, analyze, manage, and service the media asset for downstream analysis and utilities, such as enhanced content distribution and consumption. In various embodiments, a content genome can comprise a set of content genes, including a category or subcategory of metadata as illustrated in an example content genome graph in FIGS. 10A and 10B, as described herein. A media asset (or a title of the media asset) may correspond to multiple (or a set) of content genomes, each content genome corresponding to a set of content genes specific for a geographical region. Content genome(s) of a media asset can be referred to as content genome(s) of a title of the media asset. Based on the content genomes generated for a media asset, a system may identify and relate relevant media assets based on a degree of overlap between each associated content genome for a more accurate and customized content recommendation for customers of diverse cultural backgrounds.

In various embodiments, a content genome may include three data components that are identified by the associated metadata, including a content data component, a context data component, and a structural data component. A content data component includes content data of a title (e.g., an information object) of a media asset. The content components may be intrinsic to the title. A context data component represents the who, what, why, where, and how with respect to the creation of the title and its subsequent life. Context data components may be extrinsic to the title. A structural data component relates to the formal set of associations and relationships within or among individual titles. Structural data components to the title may be intrinsic, extrinsic, or both.

Various embodiments described herein can use state-of-the-art machine-learning (ML) and artificial intelligence (AI) to analyze and process millions of hours of media assets and the associated metadata created daily in order to effectively identify relevant content signals (e.g., elements) of a given timestamp, and use a machine learning algorithm to generate content genomes for the respective titles of the media assets. Specifically, the content genome generation and management system accesses content data of a media asset and a set of input cues associated with the media asset. The set of input cues may include at least one of the metadata of the media asset, including but not limited to a genre of the media asset, a descriptive keyword of the media asset, or a third-party review or comment of the media asset. The content genome generation and management system identifies a set of elements based on the content data of the media asset and the set of input cues. The set of elements corresponds to a timestamp of the media asset. An element may be a content signal at a given time interval or timestamp. For example, a video clip in a movie within a time interval (e.g., 0:10:00-0:10:05) may comprise all types of content signals, including video element (e.g., plural picture frames), audio element (e.g., background music, dialog, etc.), text element (e.g., subtitles), and input cues (e.g., metadata indicating information of cast members appearing in the video clip, etc.). As another example, an audio clip in an audio type of media asset (e.g., a recording) may comprise only an audio element as the only type of content signal. A time interval (e.g., a duration of time) may be associated with plural consecutive timestamps (e.g., a given point in time). In various embodiments, a text element may be captions or subtitles associated with the time interval or any input cues, including genre, descriptive keywords, and reviewer comments of the media asset. An input cue serves as a content signal and may or may not be specific to a time interval.

In various embodiment, the content genome generation and management system may assign a set of weight values to the identified elements at a timestamp based on priority rules. Specifically, there may be more than one mode (e.g., element) identified at any given timestamp or time interval on a video or audio timeline. However, fewer than all four elements may contribute more significantly (e.g., be more relevant) to interpreting an event within a time interval or at a timestamp. For example, in a horror scene setting where a monster hides and makes eerie noise, the sound effect may add more significance to the desired effect to create the atmosphere than the visual, text, or any of the elements associated with the input cues. In this specific example, the audio element may be assigned with the highest weight value compared to the rest of the available elements. As another example, in a horror scene setting where the monster suddenly jumps in front of a character, both a visual element and audio element may contribute significantly to the desired effect over text or any of the elements associated with the input cues. In this particular example, both the audio and visual elements may receive the highest weight value, followed by text and other elements associated with the input cues. In various embodiments, all the elements may contribute equally to the interpretation and explanation of the event so that they may be assigned with the same or similar weight value. The content genome generation and management system may use a machine learning framework or algorithm to determine relevancy and assign weight values to each determined element accordingly. Different types of machine learning algorithms include, without limitation, decision tree algorithm, random forest algorithm, graph neural network algorithm, matrix factorization algorithm, logistic regression algorithm, or scalable vector machines algorithm. Each machine learning algorithm may correspond to an associated machine learning framework. In various embodiments, the priority rule may be determined by the training data available to the multi-modal architecture and/or the type of machine learning algorithm being selected.

In various embodiments, the content genome generation and management system may rank the assigned weight values and identifies one or more elements with the highest weight values as relevant elements. The content genome generation and management system may use a machine learning algorithm to analyze the relevant elements to generate a set of classified features, based on which the system generates one or more content genomes for the title or the associated media asset.

In various embodiments, the content genome generation and management system may identify a flaggable event in the media asset at least based on the set of classified features and a set of tags. The set of tags may be generated by a human reviewer, a tag generation system internal or external to the content genome generation and management system in the multi-modal architecture, or by a third-party system. An AI-based tag generation system may return tags for a given media asset at each timestamp based on training data that include a significant number of recognizable objects, living beings, scenery, and actions. One or more tags may be associated with a given timestamp. Tags may relate to event classifications defined by a predetermined event classification ontology or taxonomy, including alcohol, blasphemy, cinematography, discrimination, horror, imaginary, LGBTQ (lesbian, gay, bisexual, transgender, and queer), nudity, violence, political extremism, profanity, sex, and violence. In various embodiments, tags may correspond to features (e.g., classified features) extracted by a machine learning framework during a feature engineering process.

As used herein, a scene can comprise multiple events that occur within (e.g., are presented by) content of a media asset over a duration of a timeline (e.g., a range of timestamps, timecodes, or time interval) of the media asset. As used herein, timestamp and timecode are used interchangeably.

As used herein, a machine learning (ML) model can comprise any predictive model that is generated based on or that is trained on) training data. Once generated/trained, a machine learning model can receive one or more inputs (e.g., one or more tags), extract one or more features, and generate an output for the inputs based on the model's training. Different types of machine learning models can include, without limitation, ones trained using supervised learning, unsupervised learning, reinforcement learning, or deep learning (e.g., complex neural networks).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a content genome generation and management system in a multi-modal artificial intelligence (AI) system for media assets (hereafter, the content genome generation and management system 122, or system 122), according to various embodiments of the present disclosure. By including the content genome generation and management system 122, the data system 100 (e.g., the multi-modal artificial intelligence (AI) system) can facilitate the generation and management of content genomes for titles and the associated media assets, based on cultural attributes relevant to the respective geographical regions. By including the content genome generation and management system 122, the data system 100 can identify emotional or flaggable events in media assets based on the generated content genomes. In particular, a user at the client device 102 can access the content genome generation and management system 122 (e.g., via a graphical user interface presented on a software application on the client device 102) and use the system 122 to generate content genomes for a media asset (e.g., video asset or audio asset) selected by the user.

As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the content genome generation and management system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where the client device 102 provides content genomes generation and flaggable events identification operations, such as determining (e.g., identifying) content signals (e.g., elements) based on content data of a media asset and the associated input cues at a timestamp or within a time interval, ranking weight values assigned to each identified element, using a machine learning algorithm to generate content genomes for the title and the associated media asset, and identifying flaggable event based on the content genomes.

The server system 108 supports various services and operations that are provided to the client software application 104 by the content genome generation and management system 122. Such operations include transmitting data from the content genome generation and management system 122 to the client software application 104, receiving data from the client software application 104 to the system 122, and the system 122 processing data generated by the client software application 104. This data may include but is not limited to requests and responses relating to analyzing content signals (e.g., elements) based on content data of a media asset for the generation of content genomes and requests and responses relating to identifying emotional or flaggable events in the media asset. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the content genome generation and management system 122. The application server 116 is communicatively coupled to a database server 118, which facilitates access to a database 120 that stores data associated with the application server 116, including data that may be generated or used by the content genome generation and management system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the content genome generation and management system 122 of the application server 116 including, without limitation: determining (e.g., identifying) content signals (e.g., elements); ranking weight values assigned to each identified element; generating content genomes for the title and the associated media asset; and identifying flaggable events based on the content genomes.

The application server 116 hosts a number of applications and subsystems, including the content genome generation and management system 122, which supports various functions and services with respect to various embodiments described herein.

The application server 116 is communicatively coupled to a database server 118, which facilitates access to database(s) 120 in which may be stored data associated with the content genome generation and management system 122. Data associated with the content genome generation and management system 122 can include, without limitation, content data of media assets and the associated metadata, content genome graph based on a predetermined content and cultural classification ontology or taxonomy, cultural attribute graph for each identified event, scene, theme, genre, and subgenre based on the predetermined cultural attributes classification ontology/taxonomy, etc.

Figure 2:
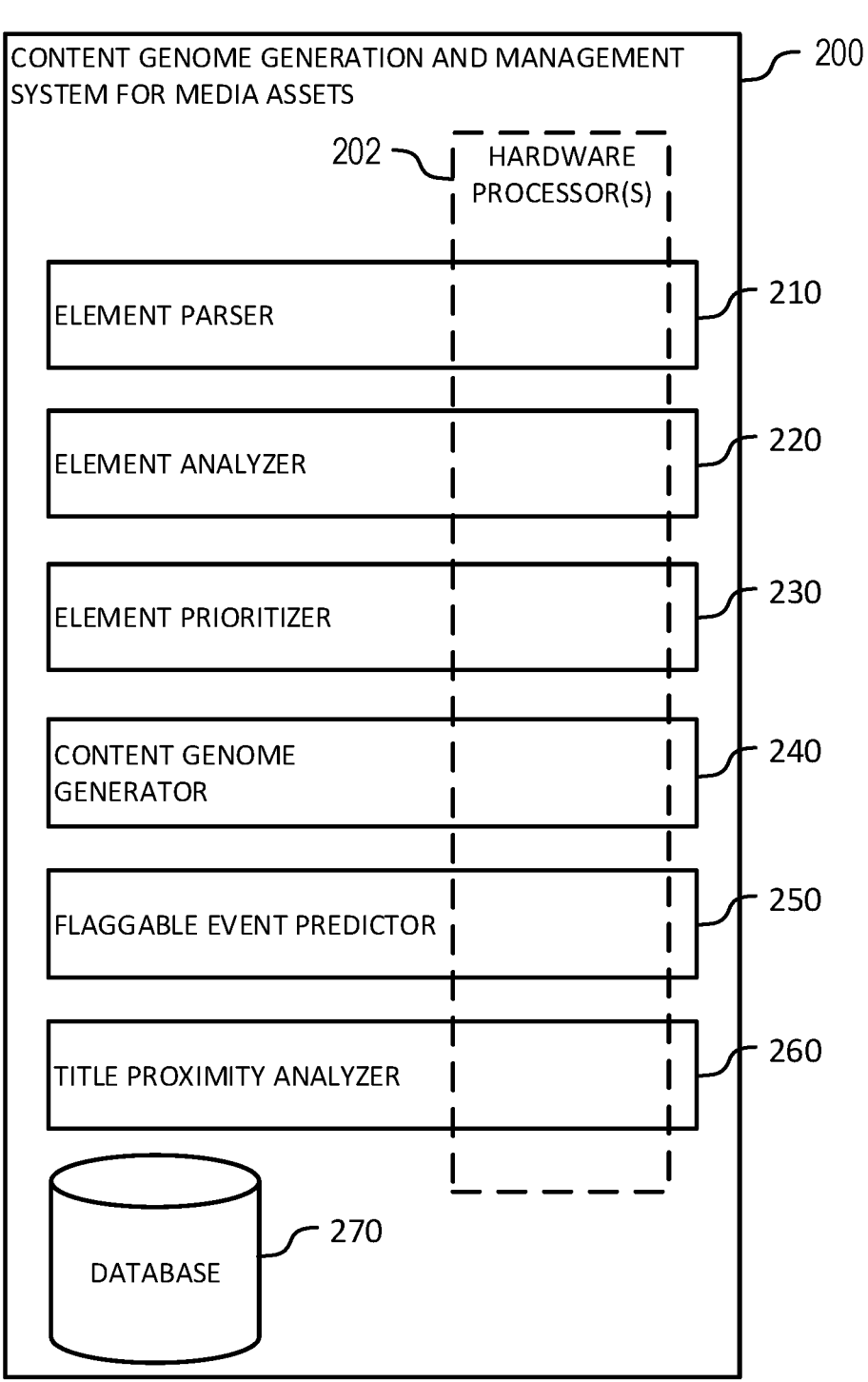
FIG. 2 is a block diagram illustrating an example content genome generation and management system for media assets, according to various embodiments of the present disclosure.

FIG. 2 is a block diagram illustrating an example content genome generation and management system 200 for media assets, according to various embodiments of the present disclosure. For some embodiments, the content genome generation and management system 200 represents an example of the data system 100 described with respect to FIG. 1. As shown, the content genome generation and management system 200 comprises an element parser 210, an element analyzer 220, an element prioritizer 230, a content genome generator 240, a flaggable event predictor 250, and a title proximity analyzer 260. According to various embodiments, one or more of the element parser 210, element analyzer 220, element prioritizer 230, content genome generator 240, flaggable event predictor 250, and title proximity analyzer 260 are implemented by one or more hardware processors 202. Data generated by one or more of the element parser 210, element analyzer 220, element prioritizer 230, content genome generator 240, flaggable event predictor 250, and title proximity analyzer 260 may be stored in a database (or datastore) 270 of the content genome generation and management system 200. In various embodiments, a number of elements and the associated metadata (e.g., tags) may be available at a given timestamp. The content genome generation and management system 200 may identify the most relevant element as the key content signals (e.g., relevant elements), based on which system 200 generates content genomes that best represent the title of the media asset.

The element parser 210 is configured to determine (e.g., identify) a set of elements at a given timestamp based on the content data of a media asset and the associated metadata by the content genome generation and management system 200. In various embodiments, the system 200 may cause the display of the parsed elements at a given time stamp in a panel or window with a timeline and content player controls in a graphical user interface at a client device (e.g., 102). The graphical user interface can include a time bar for the content data of the media asset, where the time bar can include a visual indicator for each timestamp of the media asset that is associated with an identified element for each range of timestamps (e.g., a time interval). Additionally, the graphical user interface can include a listing of tags that correspond to events or scenes identified in the content data of the media asset. Each tag in the listing of tags can be displayed with one or more event classification labels associated with the event or scene corresponding to the tag. In various embodiments, the event classification labels or tags can be selected from an event classification graph defined by a predetermined event classification ontology/taxonomy.

For some embodiments, the element parser 210 comprises computing units each to automatically determine (e.g., identify) a specific type of content signal (e.g., element). The computing units may include a first unit for identifying audio elements, a second unit for identifying video elements, a third unit for identifying text elements, and a fourth unit for identifying the associated metadata, including input cues. Each computing unit may comprise a machine learning model on data previously generated during identification processes of each type of content signal (e.g., element or mode).

The element analyzer 220 is configured to generate weight values to identify content signals or elements based on priority rules. The element analyzer 220 may also comprise four machine learning models for multi-model analysis. Each model is responsible for generating weight values for each type of element (e.g., mode). In various embodiments, the element analyzer 220 may comprise one machine learning model that is training to generate weight values for all types of elements.

The element prioritizer 230 is configured to rank the elements at a given timestamp based on the assigned weight values and determines one or more elements associated with higher rankings (e.g., rankings above a pre-determined threshold value) as relevant elements.

Figure 7:
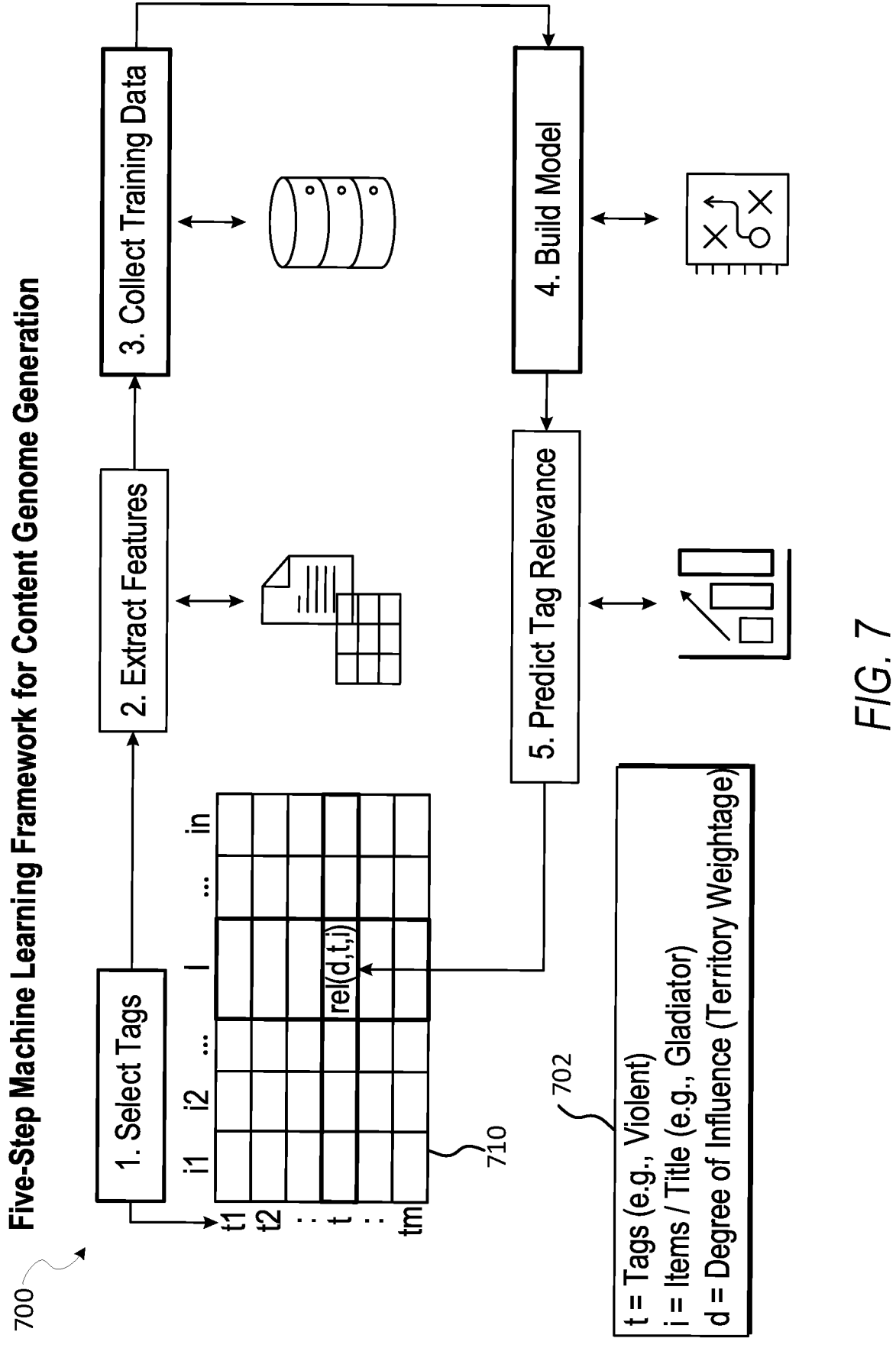
FIG. 7 is a flowchart illustrating data flow within an example machine learning framework for content genome generation within an example content genome and management system for media assets during operation, according to various embodiments of the present disclosure.

The content genome generator 240 is configured to use a machine learning algorithm or framework to generate one or more content genomes for the title of the selected media asset. In various embodiments, the content genome generator 240 comprises a content genome generator machine learning model 342 that analyzes one or more relevant elements based on the output of the element prioritizer 230 and generates a set of classified features. For example, as illustrated in FIG. 7, the content genome generator 240 selects vectors, including at least one of the tags, the title of the selected media asset, and a degree of influence indicated by cultural attributes specific to a relevant geographical region. Based on the selected vectors, the content genome generator 240 extracts features via a feature engineering process. As understood by a person of ordinary skill in the art, feature engineering refers to a machine learning process that transforms raw data into features that represent the issues to the predictive machine learning models, resulting in improved model efficiency and accuracy.

The flaggable event predictor 250 is configured to identify emotional or flaggable events based on the generated content genomes.

The title proximity analyzer 260 is configured to determine a degree of overlap between content genomes by determining a degree of overlap between respective set of content genes that collectively represent the respective content genome. In various embodiments, the first content genome includes a first cluster of content genes generated for a first media asset, and the second content genome includes a second cluster of content genes generated for a second media asset. The title proximity analyzer 260 may determine an overlap between the first cluster of content genes and the second cluster of content genes. The title proximity analyzer 260 may identify the degree of overlap between the two clusters and determine if the first media asset (or the title thereof) is relevant to the second media asset (or the title thereof), and the extent to which they are relevant. For example, the title proximity analyzer 260 may determine the first media asset is relevant to the second media asset in terms of release year, age rating, genre, cultural expression, etc. Once the title proximity analyzer 260 determines the two media assets are relevant, it may associate the first media asset with the second media asset for global distribution, content recommendation purposes, or other downstream utilities and analysis.

In various embodiments, culture-specific content genomes may be generated based on cultural attributes available for each relevant geographical region. Therefore, for the same media asset associated with the same title, the first culture-specific content genome generated for a first geographical region may comprise a different set of culture-specific content genes from the second culture-specific content genome generated for a second geographical region. In various embodiments, the title proximity analyzer 260 may identify a degree of overlap between two clusters of culture-specific content genes and determine if they overlap to the extent that the media assets in the two geographical regions shall be associated for downstream utilities and analysis.

Figure 3:
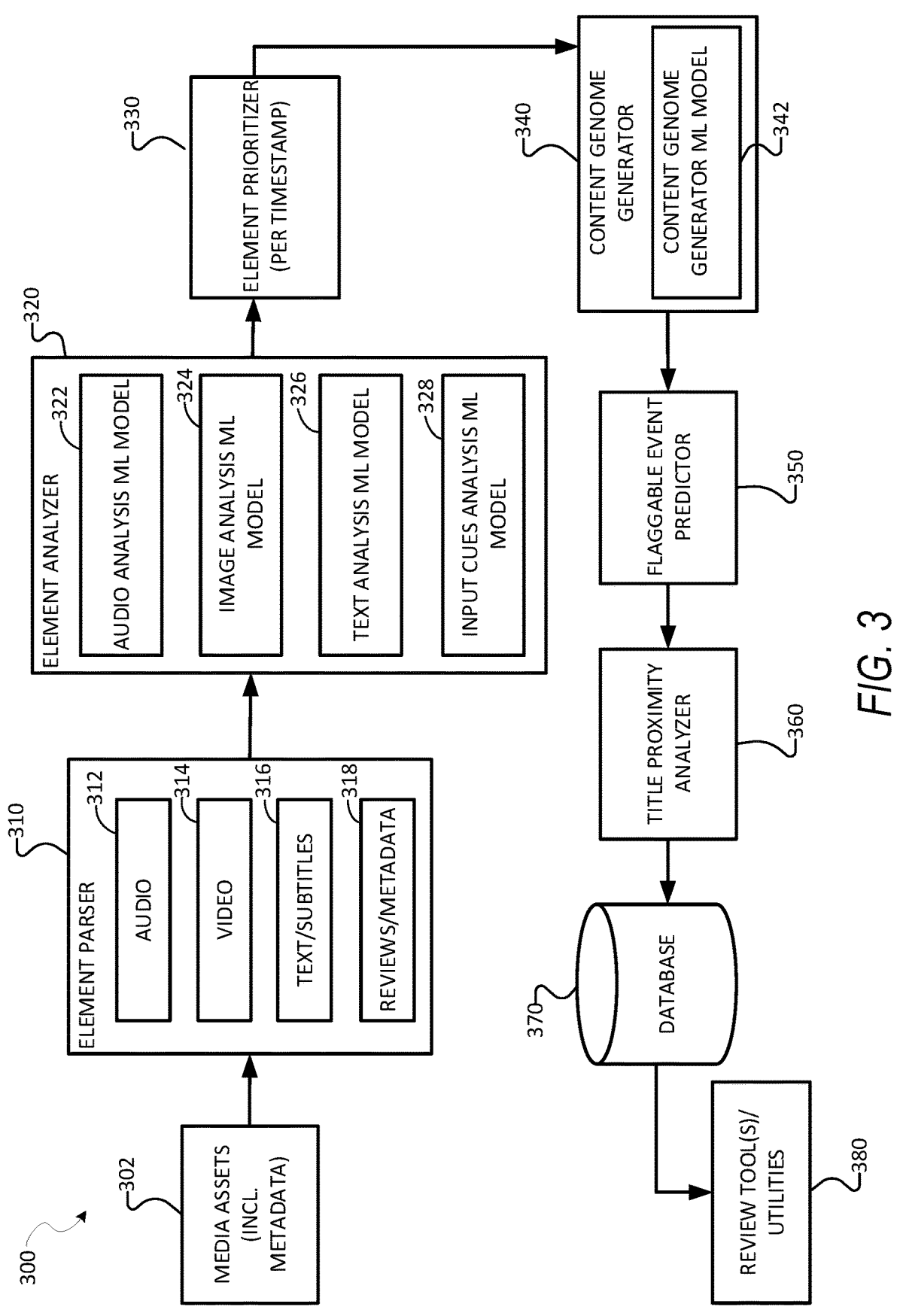
FIG. 3 is a flowchart illustrating data flow within an example content genome generation and management system for media assets during operation, according to various embodiments of the present disclosure.

FIG. 3 is a flowchart illustrating data flow within an example content genome generation and management system 300 for media assets during operation, according to various embodiments of the present disclosure. As shown, the content genome generation and management system 300 comprises an element parser 310, an element analyzer 320, an element prioritizer 330, a content genome generator 340, a flaggable event predictor 350, a title proximity analyzer 360, and a database 370. In various embodiments, the element parser 310, element analyzer 320, element prioritizer 330, content genome generator 340, flaggable event predictor 350, and title proximity analyzer 360 are respectively similar to the element parser 210, element analyzer 220, element prioritizer 230, content genome generator 240, flaggable event predictor 250, and title proximity analyzer 260 of the content genome generation and management system 200 of FIG. 2. Additionally, each of the element parser 310, element analyzer 320, element prioritizer 330, content genome generator 340, flaggable event predictor 350, and title proximity analyzer 360 can comprise a machine learning (ML) model that enables or facilitates operation as described herein.

During operation, a media asset 302 (e.g., video or audio media asset) and the associated metadata is received and processed by the element parser 310, which determines (e.g., identifies) a set of elements at a given timestamp based on the content data of media asset 302 and the associated metadata. In various embodiments, the element parser 310 may comprise computing units (e.g., 312, 314, 316, and 318). Each unit may comprise a machine learning model and automatically determine (e.g., identifies) a type of element (e.g., mode). As illustrated in FIG. 3, the computing unit 312 determines (e.g., identifies) audio elements, unit 314 determines (e.g., identifies) video elements, unit 316 determines (e.g., identifies) text/subtitles elements, and unit 318 determines (e.g., identifies) elements associated with metadata of media assets 302, such as input cues. Input cues may include but are not limited to a genre of the media asset, a descriptive keyword of the media asset, or a third-party review or comment of the media asset.

The element analyzer 320 generates weight values to the identified elements at a given timestamp based on priority rules. In various embodiments, the element analyzer 320 comprises four machine learning models (e.g., 322, 324, 326, and 328). Each model is responsible for generating weight values for each type of element (e.g., mode). The audio analysis ML model 322 is configured to generate weight values for audio elements. The image analysis ML model 324 is configured to generate weight values for visual elements. The text analysis ML model 326 is configured to generate weight values for text elements. The input cues analysis ML model 328 is configured to generate weight values for elements associated with metadata (e.g., including input cues) of media assets 302. In various embodiments, the element analyzer 320 may comprise a single machine learning model that is training to generate weight values for all types of elements. Different types of machine learning algorithms include, without limitation, decision tree algorithm, random forest algorithm, graph neural network algorithm, matrix factorization algorithm, logistic regression algorithm, or scalable vector machines algorithm. Each machine learning algorithm may correspond to an associated machine learning framework.

The element prioritizer 330 ranks the elements at a given timestamp based on the assigned weight values and determines one or more elements of the higher rankings (e.g., above a certain pre-determined threshold value) as relevant elements.

The content genome generator 340 uses a machine learning algorithm or framework (e.g., machine learning frame as illustrated in FIG. 7) to generate one or more content genomes for the title of media asset 302. In various embodiments, the content genome generator 340 analyzes one or more relevant elements based on the output of the element prioritizer 330 and generates a set of classified features. For example, as illustrated in FIG. 7, the content genome generator 340 selects vectors 702, including at least one of the tags, the title of the selected media asset, and a degree of influence indicated by cultural attributes specific to a relevant geographical region. Based on the selected vectors 702, the content genome generator 340 extracts features via a feature engineering process. Based on the extracted features, the content genome generator 340 determines if the selected tag is relevant to other selected vectors, such as the title of the selected media asset, and the degree of influence indicated by cultural attributes of a specific geographical region. If the tag is determined to be relevant, the tag may be identified as a content genome for the title.

The flaggable event predictor 350 is configured to identify emotional or flaggable events based on the generated content genomes. The flaggable event predictor 350 may comprise a machine learning model that enables or facilitates operation as described herein.

The title proximity analyzer 360 determines a degree of overlap between clusters of content genomes. In various embodiments, the degree of overlap may be determined between clusters of content genomes generated for different titles and may also be determined between clusters of culture-specific content genomes that are generated based on cultural attributes of various geographical regions. In the latter scenario, for a single media asset, a title may be associated with different clusters of content genomes, that each cluster comprises a different set of culture-specific content genomes generated for the respective geographical region.

Eventually, content genomes for the media asset 302 are generated and stored on database 370. As described herein, the process can represent a downstream analysis of the media asset 302 via reviewer tools 380 and the associated utilities based on content genomes. For instance, the reviewer tools 380 can perform (with respect to the media asset 302) content classification, artwork extraction and modification, content advisory generation, trailer generation, compliance editing, video highlight generation, scene skipping, genre detection, content filtering, cultural relevancy/prediction/distance calculation, deep metadata analysis, culturalized (culture-based) listing generation, audience segmentation and targeting, or dynamic advertising slot (or break) generation. Depending on the embodiment, content classification can comprise an automated method in which technology is used to screen content of the media asset 302 and automatically generate rating values for the media asset 302 for local markets worldwide. In general, content classification involves screening a film or television show for elements, such as violence, sexuality, or drugs, to determine its suitability for viewers by age group in a specific local market. Age ratings, also known as maturity ratings, can provide the public with the information they need to make informed viewing decisions, as well as protect children from viewing content that may be harmful to them. For example, referring to Audience Rating timeline 820, as illustrated in a graphical user interface 800 in FIG. 8, the timeline 820 comprises a series of timestamps or time intervals, corresponding to which a representative UI element (e.g., 804 or 808) indicates whether the content at a given timestamp is suitable for consumption by age groups in a particular geographical region 812 (e.g., Brazil). Age groups include young adults (at age 14), teens (at age 12), older kids (at age 10), and (younger) kids (at an age lower than 10).

Artwork extraction and modification can comprise an automated method in which artwork is extracted from content of the media asset 302, where the artwork selected for extraction is relevant for a promotional utility (e.g., for enhanced click-through rates for the media asset 302 on a digital store that presents the artwork in connection with the media asset 302). In general, media content artwork can comprise a digital poster that is used to promote and advertise content, and that is designed to persuade viewers to select content of a media asset.

Content advisory generation can comprise an automated method in which technology is used to generate local content advisories for the media asset 302 accurately and consistently. In general, content advisories, also known as content warnings, can provide detailed information about the types of objectionable content contained in film and television, such as violence, profanity, or drugs.

Trailer generation can comprise an automated method in which a trailer is generated using artificial intelligence and machine learning technology that indexes and packages the most relevant scenes of content of the media asset 302. In general, a trailer can comprise a commercial advertisement of video content that is planned for exhibition—usually for films and television shows.

Compliance editing can comprise an automated method in which technology is used to recommend the respective time-code ranges of non-compliant scenes within the media asset 302 for local markets worldwide. In general, content exhibition in local markets can be regulated to ensure compliance with content classification and censorship laws. When a particular content fails to comply with local policies, regulators can require that objectionable scenes be edited accordingly.

Video highlight generation can comprise an automated method for indexing the most relevant scenes of video content of the media asset 302 and generating one or more short video clips from these scenes such that the short video clips appeal to one or more cultural sensitivities or a value system of a local audience (e.g., for the purpose of marketing and promoting the content of the media asset 302).

Scene skipping can comprise an automated method in which time-based markers (e.g., time-code ranges) of the media asset 302 that represent the duration of the objectionable scene are captured and provided to a video/streaming platform, which can enable a feature "Skip Scene" (e.g., a graphical user interface button on the client interface that a viewer can click to skip an objectionable scene).

Genre detection can comprise an automated method for detecting a genre of content of the media asset 302, which can be used for dynamic listing or content promotion/recommendation activities for the media asset 302. In general, genres and sub-genres for media content are categories that define the content based on one or more of its narrative themes.

Content filtering can comprise an automated method in which content (e.g., such as the content of the media asset 302) is suggested to a particular viewer at a given time. In general, the filtered content can be displayed in the catalog (e.g., virtual shelves and trays) of a digital streaming platform to persuade a viewer to watch the content.

Cultural relevancy/prediction/distance calculation can comprise an automated method in which a cultural distance is measured between two or more cultures for the purposes of adapting content of the media asset 302 to improve its appeal (e.g., relatability or suitability) with respect to a local audience or to predict its appeal (e.g., relatability or suitability) with respect to the local audience, which can determine the overall success of the media asset 302 in connection with that local audience. The method can consider local laws, customs, or tastes and preferences of the viewing audience in measuring this distance.

Deep metadata analysis can comprise an automated method in which technology is used to generate, for content of the media asset 302, attributes at relevant time-code ranges that describe the content's mood, theme, time period, location, event, objectionable content, character, or another element that is important for enhanced search and discovery. In general, deep metadata regarding content of a media asset can provide definitions that organize content to make it more visible for search engines and streaming platforms.

Culturalized (culture-based) listing generation can comprise an automated method in which a listing of media assets (and the content of each listing element, such as title metadata, artwork, trailer, etc.) is generated based on localization and culturalization. In general, localization can comprise adapting content to a viewer's geographical environment in accordance with language, legal, and technology requirements, while culturalization can comprise adapting content of the media asset 302 to a viewer's cultural environment (e.g., viewer's beliefs, values, and customs).

Audience segmentation and targeting can comprise an automated method in which consumers can be profiled according to demographics, psychographics, gender, age, ethnicity, or other parameters, and consumers within a target audience or cohort can be identified (e.g., for enhanced marketing promotions and conversions) for the media asset 302.

Dynamic advertising slot (or break) generation can comprise an automated method in which a scene graph for the media asset 302 is generated, where the scene graph can provide details on emotional highs and lows in content (e.g., video content) of the media asset 302 and create time-based markers (aka time-code ranges) corresponding to the peak emotional events in the content of the media asset 302. The time-based markers, along with other deep metadata, can be provided to a video/streaming platform for optimal placement of advertisements for the media asset 302. Dynamic advertising slot/break generation can ensure that advertisements are placed dynamically in the content of a media asset at moments that would incur the greatest impact.

Figure 4:
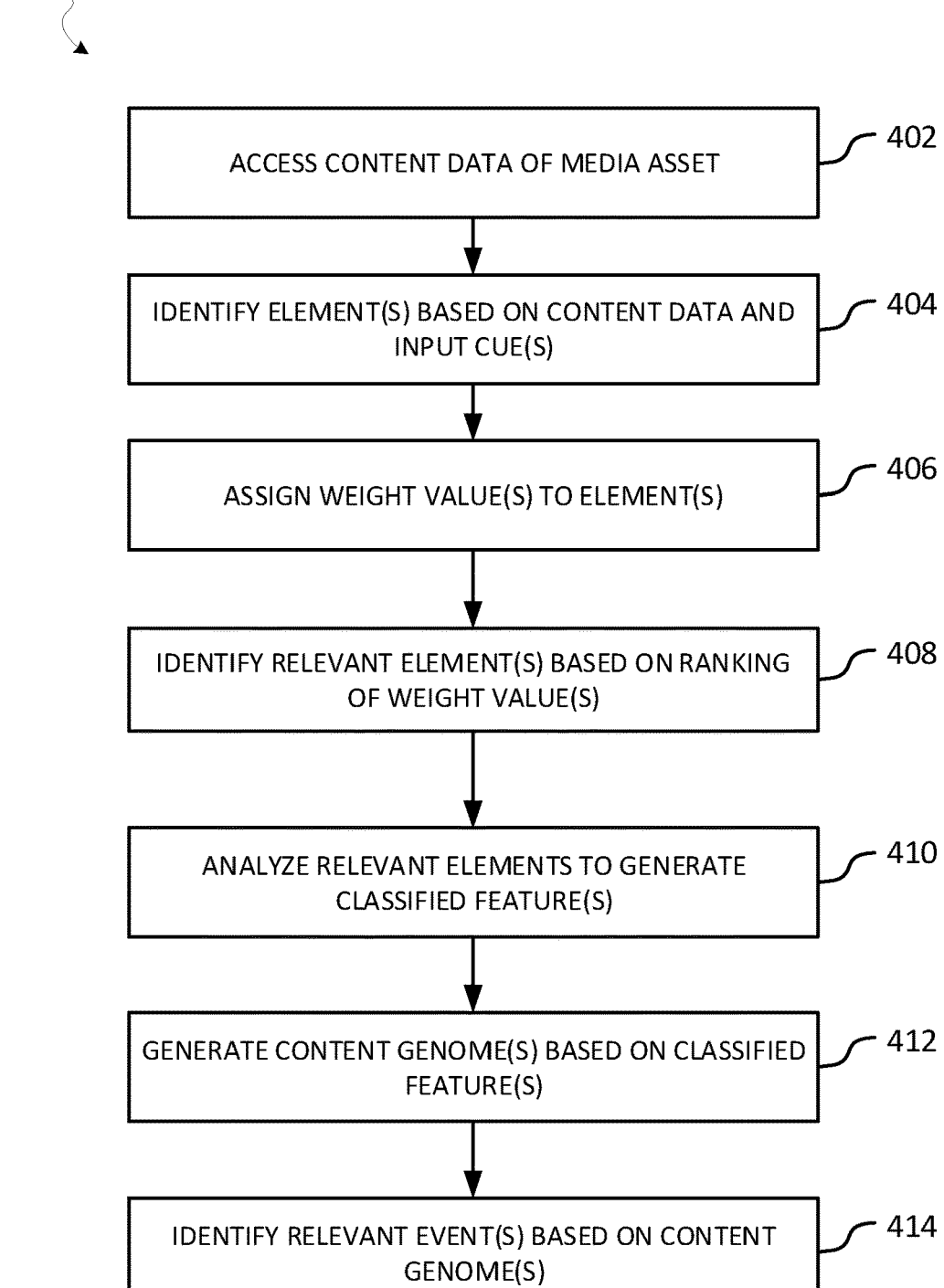
FIG. 4 is a flowchart illustrating an example method for generating and managing content genomes for media assets, according to various embodiments of the present disclosure.

FIG. 4 is a flowchart illustrating an example method 400 for generating and managing content genomes for media assets, according to various embodiments of the present disclosure. It will be understood that example methods described herein may be performed by a machine in accordance with some embodiments. For example, method 400 can be performed by the content genome generation and management system 122 described with respect to FIG. 1, the content genome generation and management system 200 described with respect to FIG. 2, the content genome generation and management system described with respect to FIG. 3, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, the processor accesses content data of a media asset and a set of input cues associated with the media asset. For some embodiments, operation 402 is performed, at least in part, by the element parser 210 as described in FIG. 2.

At operation 404, the processor identifies a set of elements (e.g., visual, audio, text, metadata, etc.) based on the content data of the media asset and the set of input cues. The set of elements corresponds to a timestamp or a time interval of the media asset. In various embodiments, operation 404 is performed, at least in part, by the element parser 210 as described in FIG. 2.

At operation 406, the processor assigns a set of weight values to the set of elements based on at least one priority rule. In various embodiments, operation 406 is performed, at least in part, by the element analyzer 220 as described in FIG. 2.

At operation 408, the processor identifies one or more relevant elements from the set of elements based on a ranking of the set of weight values. In various embodiments, operation 408 is performed, at least in part, by the element prioritizer 230 as described in FIG. 2. In various embodiments, a number of elements and the associated metadata (e.g., tags, genre, reviews) may be available at a given timestamp. The processor may identify the most relevant elements as the key content signals (e.g., relevant elements), based on which the processor generates (e.g., at operation 414) content genomes that best represent the title of the media asset. In various embodiments, the most relevant elements may be determined based on a priority rule predetermined based on the training data available to the multi-modal architecture and/or based on the machine learning algorithm being selected.

At operation 410, the processor analyzes one or more relevant elements to generate classified features via a machine learning framework, such as the one illustrated in FIG. 7. In various embodiments, operation 410 is performed, at least in part, by the content genome generator 240, as described in FIG. 2.

At operation 412, the processor accesses a pre-determined content genome graph from database 270. The pre-determined content genome graph, as an example graph illustrated in FIGS. 10A and 10B, may be generated based on a predetermined content and cultural classification ontology or taxonomy. A content genome generated for a media asset in a geographical region may include at least one or more categories or subcategories of content genes in the predetermined content genome graph. Based on the classified features, if the processor, via a machine learning algorithm or framework, determines the one or more categories or subcategories are relevant to the one or more relevant elements identified at a given timestamp, the processor may associate the one or more categories or subcategories of content genes with the current media asset. The processor may generate a content genome based on a cluster of content genes generated as described herein.

In various embodiments, a category or a subcategory of content genes in the content genome graph may correspond to a tag identified by a human reviewer, a tag generation system internal or external to the content genome generation and management system in the multi-modal architecture, or by a third party system. An AI-based tag generation system may return tags for a given media asset at each timestamp based on training data that include a significant number of recognizable objects, living being, scenery, and actions. One or more tags may be associated with a given timestamp. Tags may be associated with event classifications defined by a predetermined event classification ontology or taxonomy, including alcohol, blasphemy, cinematography, discrimination, horror, imaginary, LGBTQ (lesbian, gay, bisexual, transgender, and queer), nudity, violence, political extremism, profanity, sex, and violence. In various embodiments, tags may correspond to features extracted by a machine learning framework during a feature engineering process.

At operation 414, the processor uses a machine learning algorithm or framework to identify flaggable (e.g., emotional or relevant) events based on the generated content genome. In various embodiments, operation 414 is performed, at least in part, by the content genome generator 240, as described in FIG. 2.

In various embodiments, a title of the current media asset may be associated with a cluster of content genomes. In various embodiments, a content genome (e.g., culture-specific content genome) may be generated based on cultural attributes specific to each geographical region. A set of cultural attributes for one geographical region may be different from a set of cultural attributes for another geographical region. Therefore, with respect to the same title of the same media asset, one content genome of one geographical region may comprise a different set of content genes from the content genome of another geographical region, as culture-specific content genomes may be generated based on a unique set of cultural attributes that are specific to each geographical region.

Though not illustrated, method 400 can include an operation where a graphical user interface for generating content genomes of the media asset can be displayed (or caused to be displayed) by the hardware processor. For instance, the operation can cause a client device (e.g., the client device 102 communicatively coupled to the content genome generation and management system 122) to display the graphical user interface for generating content genomes. This operation for displaying the graphical user interface can be separate from operations 402 through 414 or, alternatively, form part of one or more of operations 402 through 414. Depending on the embodiment, the graphical user interface can be configured to receive one or more user inputs that identify at least one of: one or more elements (e.g., content signals) in the content data of the media asset at a given timestamp; one or more cultural attributes determined based on the predetermined cultural attributes classification ontology/taxonomy; one or more event classification labels for an event of the current media asset; one or more event subclassification labels for an event of the current media; one or more scenes in the content data of the current media asset; one or more themes for the current media asset; or one or more title attributes for the current media asset.

FIG. 5A and FIG. 5B are flowcharts illustrating example methods 500 and 520 for generating and managing content genomes for media assets, according to various embodiments of the present disclosure. It will be understood that example methods described herein may be performed by a machine in accordance with some embodiments. For example, methods 500 and 520 can be performed by the content genome generation and management system 122 described with respect to FIG. 1, the content genome generation and management system 200 described with respect to FIG. 2, the content genome generation and management system described with respect to FIG. 3, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of methods 500 and 520 may be represented by executable instructions that, when executed by a processor of a computing device, cause the computing device to perform the methods 500 and 520. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Specifically, FIG. 5A is a flowchart illustrating an example method 500 for generating culture-specific content genomes for a title of a selected media asset, according to various embodiments of the present disclosure.

At operation 502, the processor accesses at least one cultural attribute from a cultural attribute graph. The cultural attribute is associated with a geographical region. The cultural attribute graph may be generated based on the predetermined cultural attributes classification ontology/taxonomy. For example, a cultural attribute graph of the United States may comprise a different set of cultural attributes graph than a graph customized for Japan. A geographical region may refer to a country or a region within a country. A cultural attribute graph may be generated by the multi-modal architecture as discussed herein, or by a third-party system. In various embodiments, operation 502 is performed, at least in part, by the content genome generator 240, as described in FIG. 2.

At operation 504, the processor uses a machine learning algorithm or framework to generate a culture-specific content genome of the current media asset based on at least one classified feature and at least one cultural attribute of a geographical region. In various embodiments, the processor uses a machine learning algorithm or framework to generate a culture-specific content gene of the current media asset based on at least one classified feature and at least one cultural attribute of a geographical region. A culture-specific content genome may comprise a cluster of culture-specific content genes. Operation 504 may be performed, at least in part, by the content genome generator 240, as described in FIG. 2.

Figure 10A:
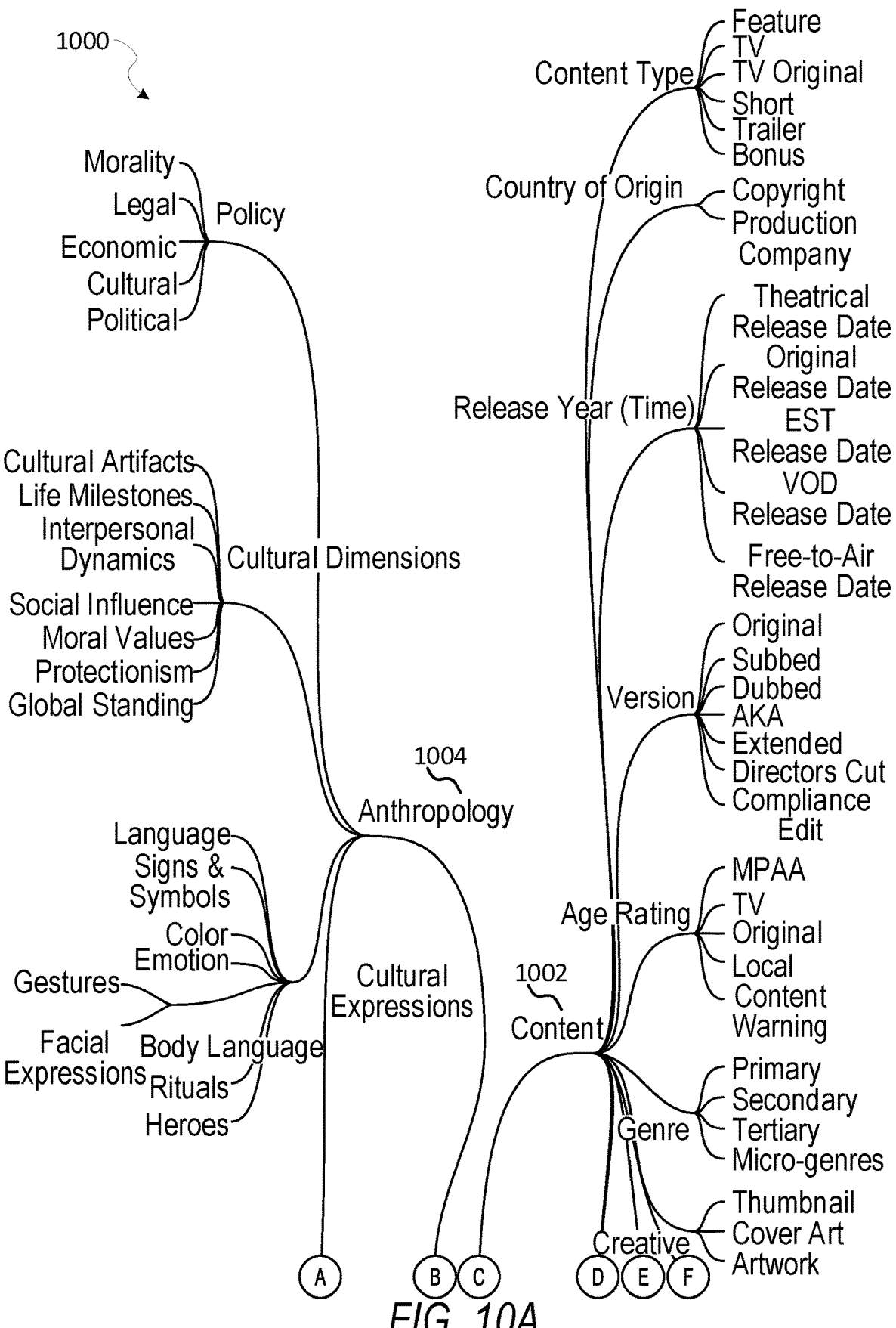
FIGS. 10A-10B illustrate an example content genome graph based on a predetermined content and cultural classification ontology or taxonomy, according to various embodiments.
Figure 10B:
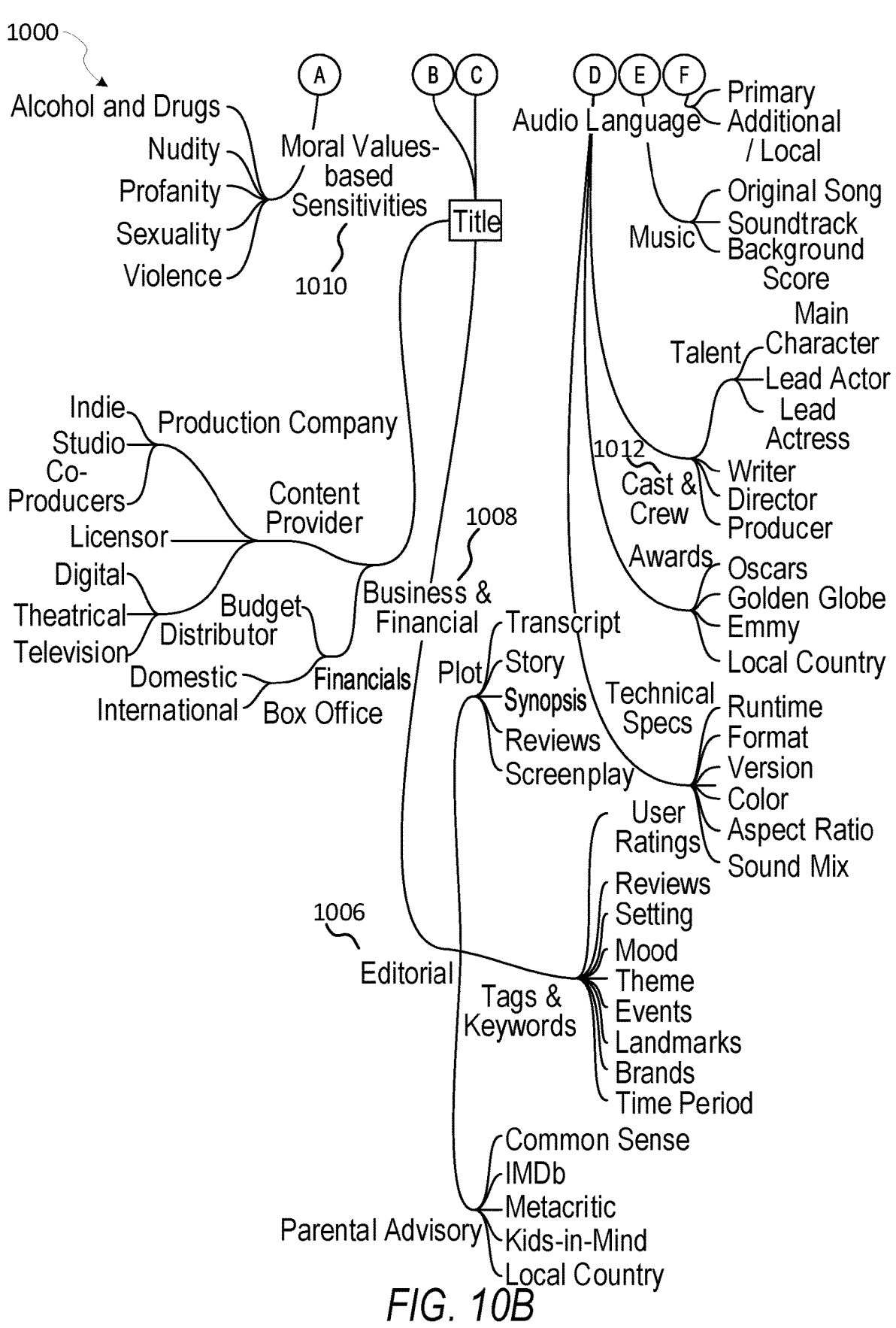

At operation 506, the processor uses a machine learning algorithm or framework to match the culture-specific content genome or content gene with a category or subcategory in the pre-determined content genome graph (e.g., the graph as illustrated in FIGS. 10A and 10B).

At operation 508, based on the matching, the processor generates at least one culture-specific content gene of the geographical region for the title of the media asset. In some embodiment, based on the matching, the processor may generate a culture-specific content genome that comprises a cluster of culture-specific content genes of the geographical region for the media asset. Operation 508 may be performed, at least in part, by the content genome generator 240 as described in FIG. 2.

FIG. 5B is a flowchart illustrating an example method 520 for determining title proximity between geographical regions of a selected media asset, or between titles of their respective media assets associated with a specific geographical region, according to various embodiments of the present disclosure. In various embodiments, operations 510-516 may be performed, at least in part, by the title proximity analyzer 260 as described in FIG. 2.

At operation 510, the processor identifies a first culture-specific content genome of the title (e.g., first title) of the current media asset corresponding to a specific geographical region. The first culture-specific content genome may comprise a cluster (e.g., first cluster) of first culture-specific content genes.

At operation 512, the processor identifies a second culture-specific content genome of a title (e.g., second title) of another media asset (e.g., second media asset) corresponding to the same specific geographical region. The second culture-specific content genome may comprise a cluster of second culture-specific content genes.

At operation 514, the processor determines a degree of overlap between the first culture-specific content genome and the second culture-specific content genome. Specifically, the processor determines a degree of overlap between the first cluster of the first culture-specific content genes ("first cluster") and the second cluster of the second culture-specific content genes ("second cluster"). Both the first cluster and the second cluster are associated with the same geographical region.

At operation 516, if the processor determines the degree of overlap exceeds a pre-determined threshold, such as above fifty percent, the processor may associate (e.g., relate) the first media asset with the second media asset for downstream utilities and analysis, such as content recommendations for users in the specific geographical region.

Figure 6:
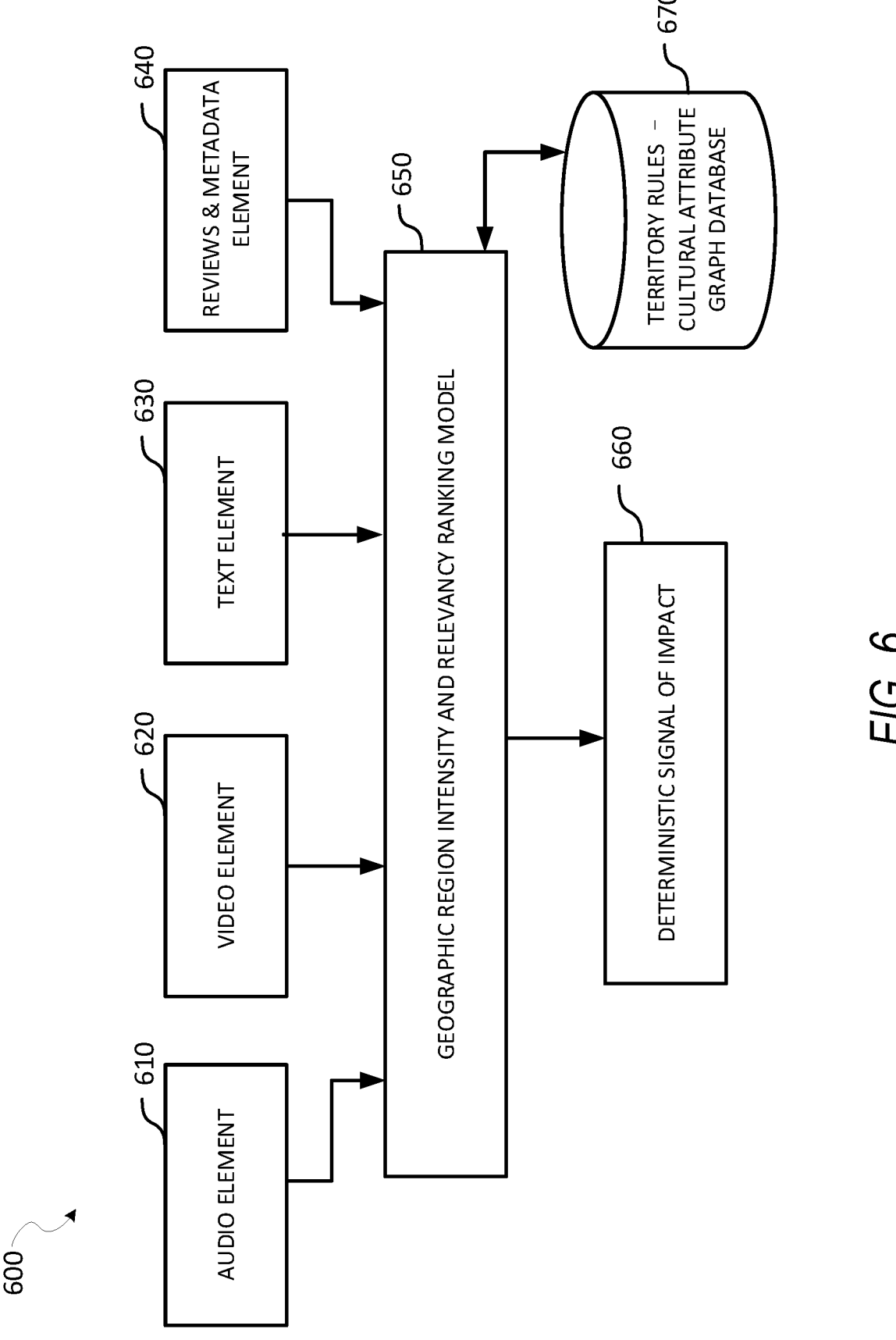
FIG. 6 is a flowchart illustrating data flow within an example element prioritizer unit within an example content genome generation and management system for media assets during operation, according to various embodiments of the present disclosure.

FIG. 6 is a flowchart illustrating data flow 600 within an example element prioritizer unit within an example content genome generation and management system for media assets during operation, according to various embodiments of the present disclosure. For some embodiments, an element prioritizer, such as element prioritizer 230 as illustrated in FIG. 2, may process, via a geographic region intensity and relevancy ranking model 650, a set of elements, including audio element 610, video element 620, text element 630, and element 640 associated with reviews and metadata (e.g., input cues). Based on territory rules associated with cultural attributes stored in database 670, the geographic region intensity and relevancy ranking model 650 may be at least one machine learning model, as described in FIG. 2. The geographic region intensity and relevancy ranking model 650 may generate a deterministic signal of impact 660, including one or more relevant elements as the key/critical content signals. Based on the deterministic signal of impact

660, the content genome generation and management system 200 generates culture-specific content genomes that best represent the title or content data of the current media asset in a specific geographical region.

FIG. 7 is a flowchart illustrating data flow 700 within an example machine learning framework for content genome generation within an example content genome and management system for media assets during operation, according to various embodiments of the present disclosure. Different types of machine learning algorithms include, without limitation, decision tree algorithm, random forest algorithm, graph neural network algorithm, matrix factorization algorithm, logistic regression algorithm, or scalable vector machines algorithm. The data flow 700 may be processed by the content genome generation and management system 122 described with respect to FIG. 1, the content genome generation and management system 200 described with respect to FIG. 2, the content genome generation and management system described with respect to FIG. 3, or individual components thereof.

In various embodiments, the content genome generation and management system 200, as illustrated in FIG. 2, for example, may select (e.g., step 1) vectors 702 from a matrix 710. The matrix 710 includes at least one of the vectors (or dimensions) T, I, and D. Vector T represents a tag (e.g., an element associated with metadata) that may be generated by a human reviewer, a tag generation system internal or external to the content genome generation and management system in the multi-modal architecture, or by a third party system, such as Computer Vision. Vector I represents an item, such as a title of a selected media asset (e.g., Gladiator). Vector D represents a degree of influence associated with cultural attributes in a specific geographical region.

In various embodiments, the content genome generation and management system 200 extracts (e.g., step 2), via a feature engineering process, a set of classified features based on the vectors selected from the matrix 710. System 200 collects (e.g., step 3) training data, builds (e.g., step 4) one or more predictive models, and predicts (e.g., step 5) if the tag element is relevant to the media asset at a given timestamp or within a given time interval. In various embodiments, the content genome generation and management system 200 assigns a weight value based on the determined relevancy for an element.

In various embodiments, for each identified element (e.g., visual, audio, text, or metadata), the content genome generation and management system 200 may associate the element with vectors I and D to generate a weight value based on the determined relevance in step 5, as illustrated in FIG. 7.

Figure 8:
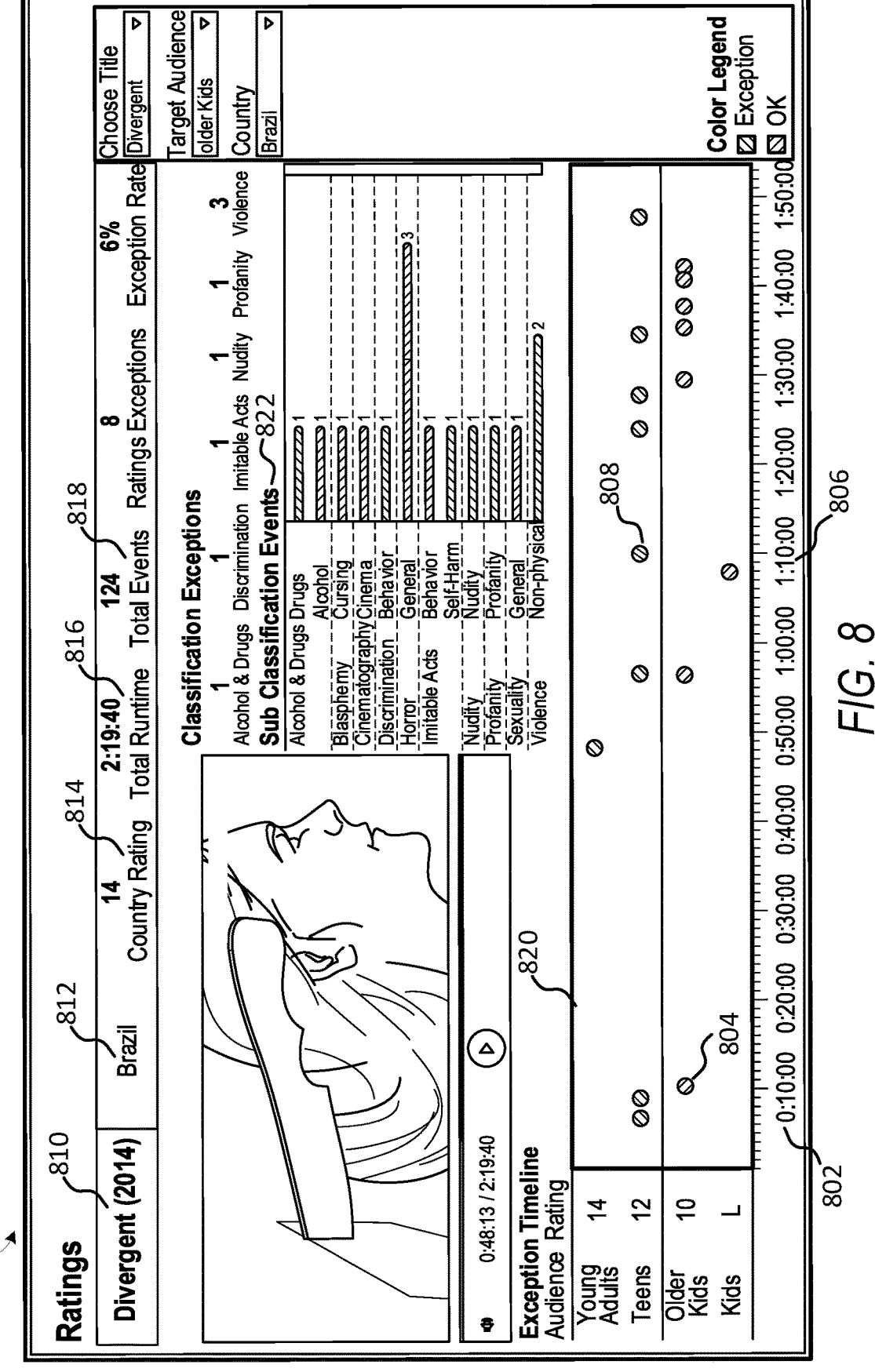
FIG. 8 illustrates an example graphical user interface caused to be displayed by an example content genome generation and management system for media assets during operation, according to various embodiments of the present disclosure.

FIG. 8 illustrates an example graphical user interface 800 caused to be displayed by an example content genome generation and management system for media assets during operation, according to various embodiments of the present disclosure. For some embodiments, the graphical user interface 800 is displayed on a client device and enables a user to identify a media asset 810 (e.g., movie Divergent 2014), a specific geographical region 812 (e.g., Brazil), cultural attribute 814 (e.g., country rating), content data of the media asset (e.g., total runtime 816, total events 818), and classification or subclassification 822 of events and the associated tags or features, such as alcohol & drugs, discrimination, imitable acts, nudity, profanity, violence, etc. The graphical user interface 800 can provide users with the information needed to make informed viewing decisions, and protect children from viewing content that may be harmful to them. For example, the Audience Rating timeline 820 comprises a series of timestamps or time intervals, corresponding to which a representative UI element (e.g., 804 or 808) indicates whether the content at a given timestamp is suitable for consumption by age groups in a particular geographical region 812 (e.g., Brazil). Age groups include young adults (at age 14), teens (at age 12), older kids (at age 10), and younger kids (at an age below 10). As illustrated in the Audience Rating timeline 820, at timestamp 0:10:00, as indicated by user interface (UI) element 802, the event or scene (e.g., UI element 804) is determined to be appropriate for older kids at age 10. At timestamp 1:10:00 (e.g., UI element 806), the event or scene (e. UI element 808) is an exception applicable to teens at age 12.

Figure 9:
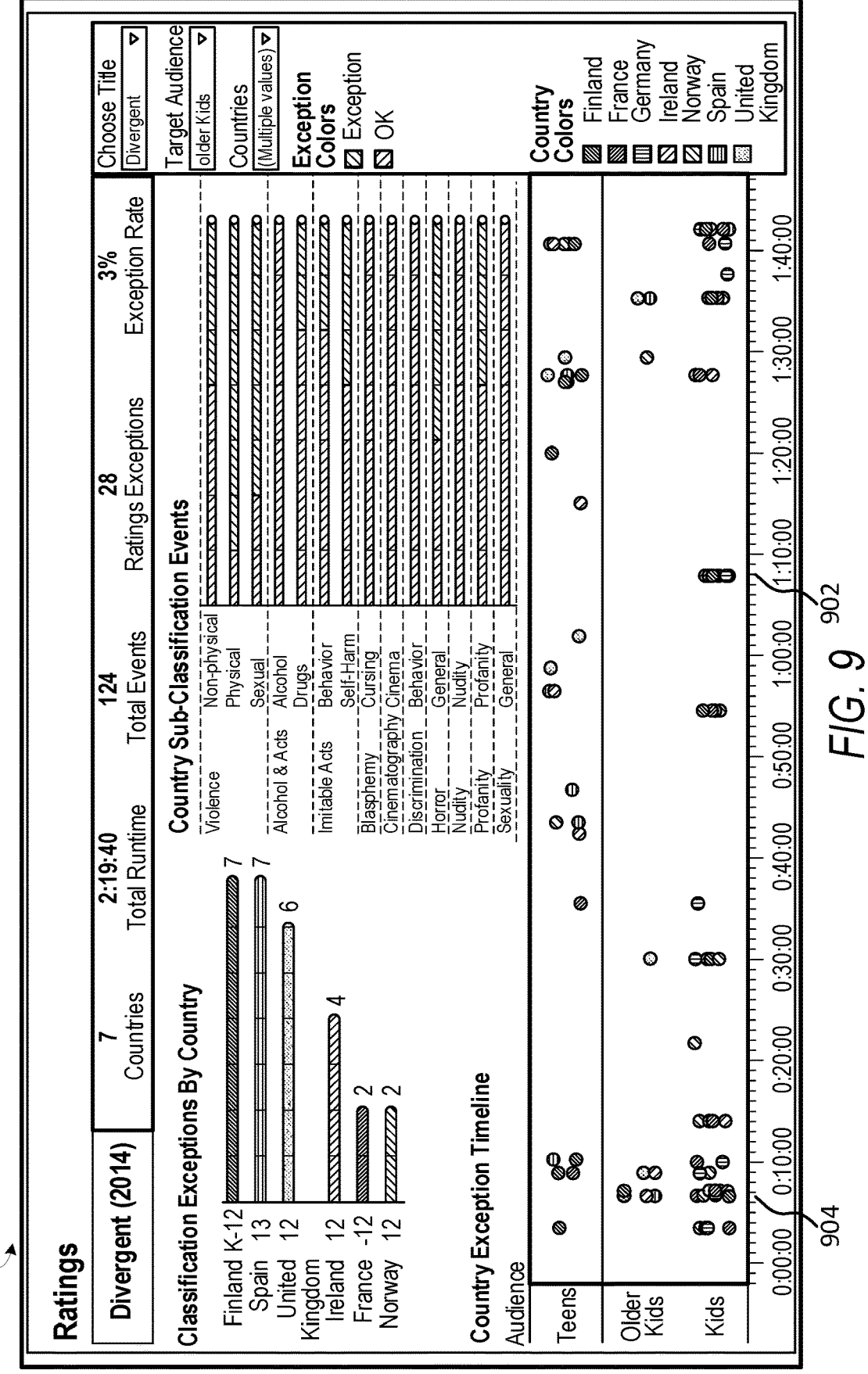
FIG. 9 illustrates an example graphical user interface caused to be displayed by an example content genome generation and management system for media assets during operation, according to various embodiments of the present disclosure.

FIG. 9 illustrates an example graphical user interface 900 caused to be displayed by an example content genome generation and management system for media assets during operation, according to various embodiments of the present disclosure. For some embodiments, the graphical user interface 900 is displayed on a client device, and enables a user to identify, among other user interface elements as illustrated, a rating exception for each given timestamp in a timeline sorted by countries (e.g., geographical regions). For example, as illustrated in the graphical user interface 900, at timestamp 1:08:00 (e.g., UI element 902), all the contrasting circles representative of each listed country gathered to correspond to kids audience (e.g., below 10 years old), indicating the content at timestamp 1:08:00 is determined to be appropriate for kids under the age of 10 in all listed countries, including Finland, France Germany, Ireland, Norway, Spain, and United Kingdom. As another example, at another timestamp 0:08:00 (e.g., UI element 904), the content is determined to be appropriate for older kids in certain countries (e.g., United Kingdom, Finland, Ireland, and Spain), and for (younger) kids in other countries (e.g., France, Germany, Norway).

FIGS. 10A and 10B illustrate an example content genome graph 1000 based on a predetermined content and cultural classification ontology or taxonomy. The example content genome graph 1000 includes multi-dimensional hierarchized categories and subcategories of content genes. The hierarchized categories and subcategories of content genes in some instances may be referred to as metadata of media assets, including core metadata (e.g., Content 1002), advance metadata (e.g., Anthropology 1004), and enhanced metadata (e.g., Editorial 1006, Business & Financial 1008). In various embodiments, a content genome may comprise a set of content genes determined based on cultural attributes specific to a geographical region. If multiple geographical regions are relevant to the media asset, a media asset (or the title thereof) may correspond to multiple content genomes, each content genome corresponding to a set of content genes specific for a geographical region.

In various embodiments, classification labels or tags defined by a predetermined event classification ontology/taxonomy, as described herein, may refer to a subcategory in Moral Values-based Sensitivities 1010, including alcohol, blasphemy, cinematography, discrimination, horror, imaginary, LGBTQ (lesbian, gay, bisexual, transgender, and queer), nudity, violence, political extremism, profanity, sex, and violence, etc.

In various embodiments, culture dimensions content genomes may be generated based on elements of content data at a given timestamp and based on cultural attributes available in a specific geographical region.

In various embodiments, content genomes under the category Cast & Crew 1012 may be identified and associated with a given timestamp and may appear on a graphical user interface of an audience user when the user pauses a playback of a current media asset at the given timestamp.

Figure 11:
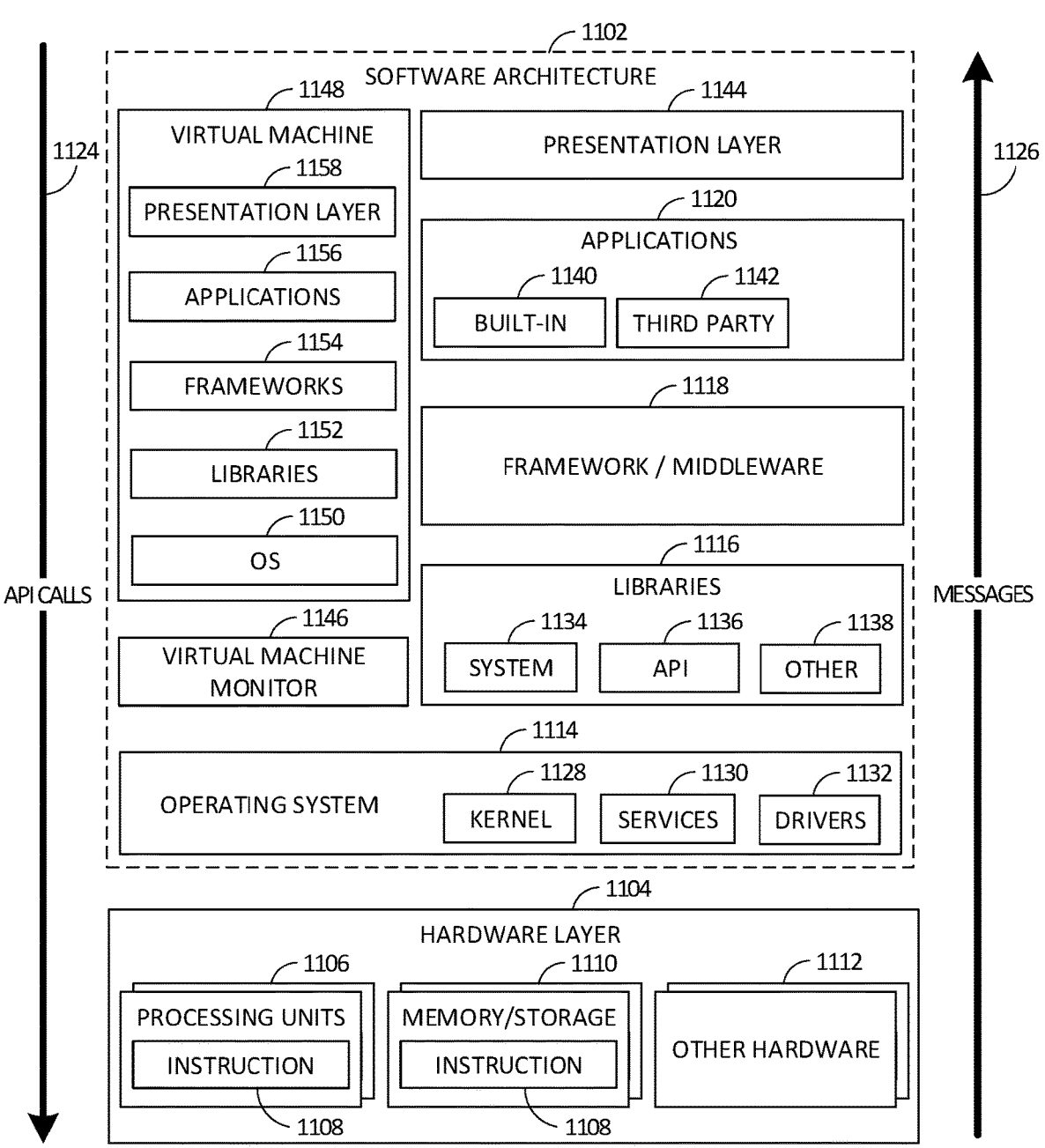
FIG. 11 is a block diagram illustrating a representative software architecture, which may be used in conjunction with various hardware architectures herein described, according to various embodiments of the present disclosure.
Figure 12:
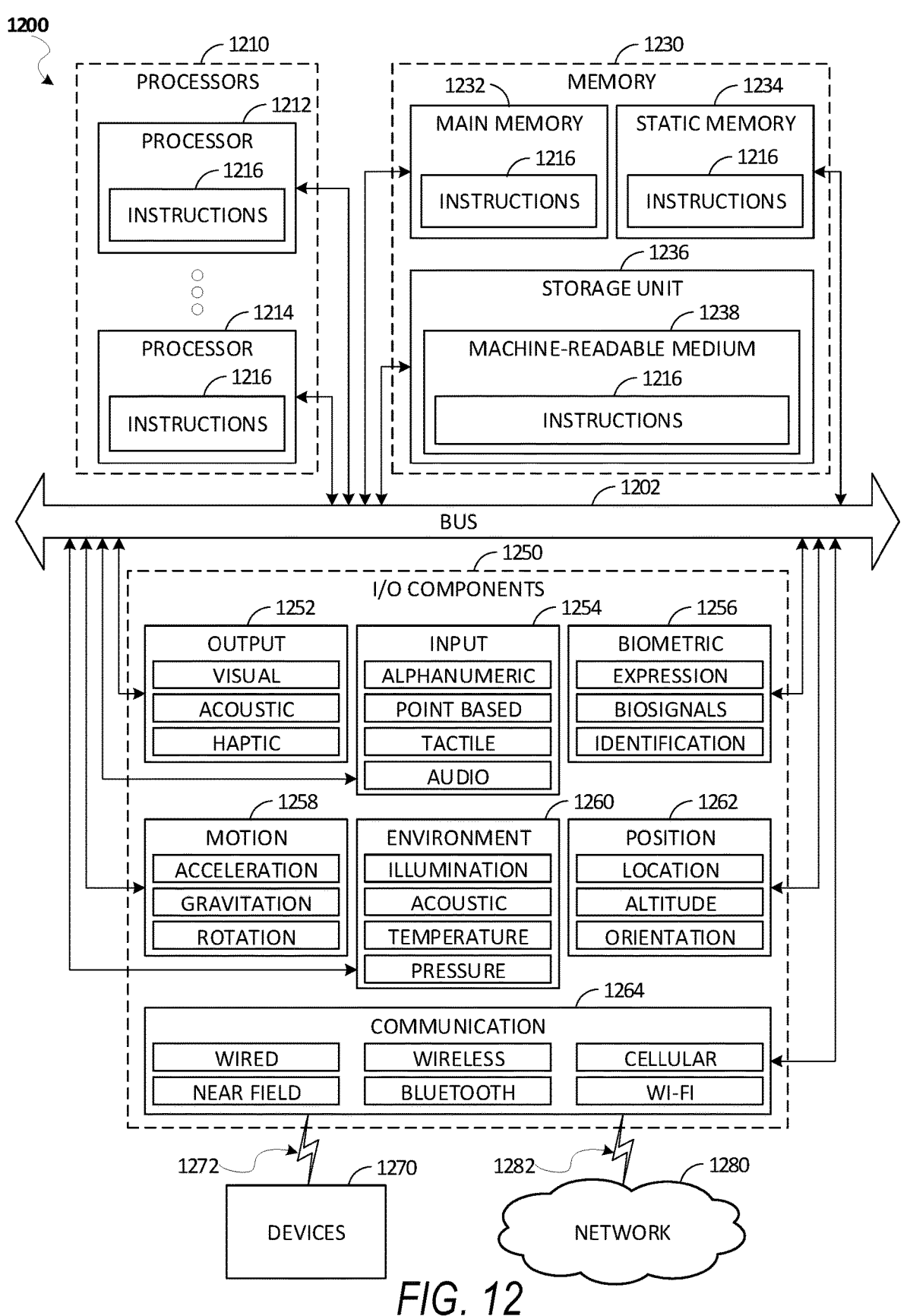
FIG. 12 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 11 or by way of the example machine illustrated by and described with respect to FIG. 12.

FIG. 11 is a block diagram illustrating an example of a software architecture 1102 that may be installed on a machine, according to some example embodiments. FIG. 11 is merely a non-limiting example of a software architecture, and it will be appreciated that many other architectures may be implemented to facilitate the functionality described herein. The software architecture 1102 may be executing on hardware such as a machine 1200 of FIG. 12 that includes, among other things, processors 1210, memory 1230, and input/output (I/O) components 1250. A representative hardware layer 1104 is illustrated and can represent, for example, the machine 1200 of FIG. 12. The representative hardware layer 1104 comprises one or more processing units 1106 having associated executable instructions 1108. The executable instructions 1108 represent the executable instructions of the software architecture 1102. The hardware layer 1104 also includes memory or storage modules 1110, which also have the executable instructions 1108. The hardware layer 1104 may also comprise other hardware 1112, which represents any other hardware of the hardware layer 1104, such as the other hardware illustrated as part of the machine 1200.

In the example architecture of FIG. 11, the software architecture 1102 may be conceptualized as a stack of layers, where each layer provides particular functionality. For example, the software architecture 1102 may include layers such as an operating system 1114, libraries 1116, frameworks/middleware 1118, applications 1120, and a presentation layer 1144. Operationally, the applications 1120 or other components within the layers may invoke API calls 1124 through the software stack and receive a response, returned values, and so forth (illustrated as messages 1126) in response to the API calls 1124. The layers illustrated are representative in nature, and not all software architectures have all layers. For example, some mobile or special-purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 or other software components/modules. For example, the frameworks 1118 may provide various graphical user interface functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a home application, a contacts application, a browser application, a book reader application, a location application, a media application, a messaging application, or a game application.

The third-party applications 1142 may include any of the built-in applications 1140, as well as a broad assortment of other applications. In a specific example, the third-party applications 1142 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 1142 may invoke the API calls 1124 provided by the mobile operating system such as the operating system 1114 to facilitate functionality described herein.

The applications 1120 may utilize built-in operating system functions (e.g., kernel 1128, services 1130, or drivers 1132), libraries (e.g., system libraries 1134, API libraries 1136, and other libraries 1138), or frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with the user.

Some software architectures utilize virtual machines. In the example of FIG. 11, this is illustrated by a virtual machine 1148. The virtual machine 1148 creates a software environment where applications/modules can execute as if they were executing on a hardware machine (e.g., the machine 1200 of FIG. 12). The virtual machine 1148 is hosted by a host operating system (e.g., the operating system 1114) and typically, although not always, has a virtual machine monitor 1146, which manages the operation of the virtual machine 1148 as well as the interface with the host operating system (e.g., the operating system 1114). A software architecture executes within the virtual machine 1148, such as an operating system 1150, libraries 1152, frameworks/middleware 1154, applications 1156, or a presentation layer 1158. These layers of software architecture executing within the virtual machine 1148 can be the same as corresponding layers previously described or may be different.

FIG. 12 illustrates a diagrammatic representation of a machine 1200 in the form of a computer system within which a set of instructions may be executed for causing the machine 1200 to perform any one or more of the methodologies discussed herein, according to an embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute the method 400 described above with respect to FIG. 4. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an embodiment, the processors 1210 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory 1230 may include a main memory 1232, a static memory 1234, and a storage unit 1236 including machine-readable medium 1238, each accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1250 may include biometric components 1256, motion components 1258, environmental components 1260, or position components 1262, among a wide array of other components. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1200 including processors 1210), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1200, but deployed across a number of machines 1200. In some example embodiments, the processors 1210 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 1230, 1232, 1234, and/or the memory of the processor(s) 1210) and/or the storage unit 1236 may store one or more sets of instructions 1216 and data structures (e.g., software) embodying or utilized by any one or more of the methodologies or functions described herein. These instructions (e.g., the instructions 1216), when executed by the processor(s) 1210, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1216 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1280 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media, Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:

accessing, by one or more hardware processors, content data of a first media asset and a set of input cues associated with the first media asset;

for each individual timestamp of a series of timestamps of the first media asset:

identifying, by an element parser that is implemented using the one or more hardware processors, a plurality of different-mode elements of the first media asset based on the content data and the set of input cues, the element parser comprising a first plurality of machine learning models that each identify a different mode of element, the plurality of different-mode elements corresponding to the individual timestamp of the first media asset;

assigning, by an element analyzer that is implemented using the one or more hardware processors, a set of weight values to the plurality of different-mode elements for the individual timestamp based on a priority rule, the element analyzer comprising a second plurality of machine learning models that each generate a weight value for a different mode of element; and identifying, by the one or more hardware processors, one or more relevant different-mode elements for the individual timestamp from the plurality of different-mode elements based on a ranking of the set of weight values;

analyzing, by the one or more hardware processors, a plurality of relevant elements for the series of timestamps using a machine learning process to generate a set of classified features based on a set of tags for the series of timestamps, each tag corresponding to an event or scene in the content data of the first media asset, the plurality of relevant elements comprising the one or more relevant elements for each of the individual timestamps;

using, by the one or more hardware processors, a machine learning algorithm to generate a content genome of the first media asset based on the set of classified features, the content genome comprising instruction code that identifies and organizes one or more flaggable events in view of cultural attributes associated with a plurality of different geographical regions;

causing, by the one or more hardware processors, a graphical user interface to be displayed on a client device, the graphical user interface comprising:

an audience rating timeline that comprises a plurality of representative user interface elements for multiple different audience groups in the plurality of different geographical regions, the plurality of representative user interface elements comprising:

a first individual representative user interface element that indicates whether the content data at a given timestamp is suitable for consumption by a first audience age group in a first geographical region of the plurality of different geographical regions based on the content genome; and a second individual representative user interface element that indicates whether the content data at the given timestamp is suitable for consumption by a second audience age group in a second geographical region of the plurality of different geographical regions based on the content genome; and a graphical user element that provides rating exception counts for the plurality of geographical regions;

performing an automated method for capturing one or more time-based markers of the first media asset that represent a duration of one or more objectionable scenes in the content data, at least one of the one or more objectionable scenes comprising a scene relating to violence, profanity, or drugs, at least one time-based marker corresponding to the given timestamp, wherein the one or more time-based markers are provided to a streaming platform to enable a skip scene feature with respect to the first media asset;

accessing, by the one or more hardware processors, a cultural attribute from a cultural attribute graph, the cultural attribute being associated with an individual geographical region;

using, by the one or more hardware processors, a machine learning algorithm to generate a culture-specific content gene of the first media asset based on the set of classified features and the cultural attribute;

identifying, by the one or more hardware processors, a first title of the first media asset based on the plurality of different-mode elements of content data;

matching, by the one or more hardware processors and using a machine learning algorithm, the culture-specific content gene with a category in a pre-determined content genome graph;

based on the matching, generating, by the one or more hardware processors, a first culture-specific content genome of the individual geographical region for the first title of the first media asset, the first culture-specific content genome comprising a first cluster of culture-specific content genes;

identifying, by the one or more hardware processors, a second title of a second media asset based on a plurality of different-mode elements of content data of the second media asset;

generating, by the one or more hardware processors, a second culture-specific content genome of the individual geographical region for the second title of the second media asset, the second culture-specific content genome comprising a second cluster of culture-specific content genes;

determining, by the one or more hardware processors, a degree of overlap between the first cluster of culture-specific content genes and the second cluster of culture-specific content genes, both the first cluster of culture-specific content genes and the second cluster of culture-specific content genes being associated with the individual geographical region; and based on the determining of the degree of overlap, associating, by the one or more hardware processors, the first media asset with the second media asset for media asset recommendations in the individual geographical region.

2. The method of claim 1, comprising:

identifying, at a single timestamp, a flaggable event in the content data at least based on the set of classified features.

3. The method of claim 1, wherein the plurality of different-mode elements comprises at least two of a video content element, an audio content element, a text content element, or an element associated with metadata of the first media asset.

4. The method of claim 1, wherein the set of input cues comprises at least one of metadata of the first media asset, a genre of the first media asset, a descriptive keyword of the first media asset, or a third-party review of the first media asset.

5. The method of claim 1, wherein the content genome is associated with content genome metadata, the content genome metadata comprising a content data component representing the content data of the first media asset, a context data component representing context of a title of the first media asset, and a structural data component representing a set of associations with other content genomes associated with the title of the first media asset.

6. A system comprising:

a memory storing instructions; and one or more hardware processors communicatively coupled to the memory and configured by the instructions to perform operations comprising:

accessing content data of a first media asset and a set of input cues associated with the first media asset;

for each individual timestamp of a series of timestamps of the first media asset:

identifying, by an element parser that is implemented using the one or more hardware processors, a plurality of different-mode elements of the first media asset based on the content data and the set of input cues, the element parser comprising a first plurality of machine learning models that each identify a different mode of element, the plurality of different-mode elements corresponding to the individual timestamp of the first media asset;

assigning, by an element analyzer that is implemented using the one or more hardware processors, a set of weight values to the plurality of different-mode elements for the individual timestamp based on a priority rule, the element analyzer comprising a second plurality of machine learning models that each generate a weight value for a different mode of element; and identifying one or more relevant elements from the plurality of different-mode elements for the individual timestamp based on a ranking of the set of weight values;

analyzing a plurality of relevant elements for the series of timestamps using a machine learning process to generate a set of classified features based on a set of tags for the series of timestamps, each tag corresponding to an event or scene in the content data of the first media asset, the plurality of relevant elements comprising the one or more relevant elements for each of the individual timestamps;

using a machine learning algorithm to generate a content genome of the first media asset based on the set of classified features, the content genome comprising instruction code that identifies and organizes one or more flaggable events in view of cultural attributes associated with a plurality of different geographical regions;

causing a graphical user interface to be displayed on a client device, the graphical user interface comprising:

an audience rating timeline that comprises a plurality of representative user interface elements for multiple different audience groups in the plurality of different geographical regions, the plurality of representative user interface elements comprising:

a first individual representative user interface element that indicates whether the content data at a given timestamp is suitable for consumption by a first audience age group in a first geographical region of the plurality of different geographical regions based on the content genome; and a second individual representative user interface element that indicates whether the content data at the given timestamp is suitable for consumption by a second audience age group in a second geographical region of the plurality of different geographical regions based on the content genome; and a graphical user element that provides rating exception counts for the plurality of geographical regions; and performing an automated method for capturing one or more time-based markers of the first media asset that represent a duration of one or more objectionable scenes in the content data, at least one of the one or more objectionable scenes comprising a scene relating to violence, profanity, or drugs, at least one time-based marker corresponding to the given timestamp, wherein the one or more time-based markers are provided to a streaming platform to enable a skip scene feature with respect to the first media asset;

accessing a cultural attribute from a cultural attribute graph, the cultural attribute being associated with an individual geographical region;

using a machine learning algorithm to generate a culture-specific content gene of the first media asset based on the set of classified features and the cultural attribute;

identifying a first title of the first media asset based on the plurality of different-mode elements of content data;

matching, using a machine learning algorithm, the culture-specific content gene with a category in a pre-determined content genome graph;

based on the matching, generating a first culture-specific content genome of the individual geographical region for the first title of the first media asset, the first culture-specific content genome comprising a first cluster of culture-specific content genes;

identifying a second title of a second media asset based on a plurality of different-mode elements of content data of the second media asset;

generating a second culture-specific content genome of the individual geographical region for the second title of the second media asset, the second culture-specific content genome comprising a second cluster of culture-specific content genes;

determining a degree of overlap between the first cluster of culture-specific content genes and the second cluster of culture-specific content genes, both the first cluster of culture-specific content genes and the second cluster of culture-specific content genes being associated with the individual geographical region; and based on the determining of the degree of overlap, associating the first media asset with the second media asset for media asset recommendations in the individual geographical region.

7. The system of claim 6, wherein the operations comprise:

identifying, at a single timestamp, a flaggable event in the content data at least based on the set of classified features.

8. The system of claim 6, wherein the plurality of different-mode elements comprises at least two of a video content element, an audio content element, a text content element, or an element associated with metadata of the first media asset.

9. The system of claim 6, wherein the set of input cues comprises at least one of metadata of the first media asset, a genre of the first media asset, a descriptive keyword of the first media asset, or a third-party review of the first media asset.

10. A non-transitory computer-readable medium comprising instructions that, when executed by a hardware processor of a device, cause the device to perform operations comprising:

accessing content data of a first media asset and a set of input cues associated with the first media asset;

for each individual timestamp of a series of timestamps of the first media asset:

identifying, by an element parser that is implemented using the hardware processor, a plurality of different-mode elements of the first media asset based on the content data and the set of input cues, the element parser comprising a first plurality of machine learning models that each identify a different mode of element, the plurality of different-mode elements corresponding to the individual timestamp of the first media asset;

assigning, by an element analyzer that is implemented using the hardware processor, a set of weight values to the plurality of different-mode elements for the individual timestamp based on a priority rule, the element analyzer comprising a second plurality of machine learning models that each generate a weight value for a different mode of element; and identifying one or more relevant different-mode elements from the plurality of different-mode elements based on a ranking of the set of weight values;

analyzing a plurality of relevant elements for the series of timestamps using a machine learning process to generate a set of classified features based on a set of tags for the series of timestamps, each tag corresponding to an event or scene in the content data of the first media asset, the plurality of relevant elements comprising the one or more relevant elements for each of the individual timestamps;

using a machine learning algorithm to generate a content genome of the first media asset based on the set of classified features, the content genome comprising instruction code that uniquely identifies and organizes one or more flaggable events in view of cultural attributes associated with a plurality of different geographical regions;

causing a graphical user interface to be displayed on a client device, the graphical user interface comprising:

an audience rating timeline that comprises a plurality of representative user interface elements for multiple different audience groups in the plurality of different geographical regions, the plurality of representative user interface elements comprising:

a first individual representative user interface element that indicates whether the content data at a given timestamp is suitable for consumption by a first audience age group in a first geographical region of the plurality of different geographical regions based on the content genome; and a second individual representative user interface element that indicates whether the content data at the given timestamp is suitable for consumption by a second audience age group in a second geographical region of the plurality of different geographical regions based on the content genome; and a graphical user element that provides rating exception counts for the plurality of geographical regions; and performing an automated method for capturing one or more time-based markers of the first media asset that represent a duration of one or more objectionable scenes in the content data, at least one of the one or more objectionable scenes comprising a scene relating to violence, profanity, or drugs, at least one time-based marker corresponding to the given timestamp, wherein the one or more time-based markers are provided to a streaming platform to enable a skip scene feature with respect to the first media asset;

accessing a cultural attribute from a cultural attribute graph, the cultural attribute being associated with an individual geographical region;

using a machine learning algorithm to generate a culture-specific content gene of the first media asset based on the set of classified features and the cultural attribute;

identifying a first title of the first media asset based on the plurality of different-mode elements of content data;

matching, using a machine learning algorithm, the culture-specific content gene with a category in a pre-determined content genome graph;

based on the matching, generating a first culture-specific content genome of the individual geographical region for the first title of the first media asset, the first culture-specific content genome comprising a first cluster of culture-specific content genes;

identifying a second title of a second media asset based on a plurality of different-mode elements of content data of the second media asset;

generating a second culture-specific content genome of the individual geographical region for the second title of the second media asset, the second culture-specific content genome comprising a second cluster of culture-specific content genes;

determining a degree of overlap between the first cluster of culture-specific content genes and the second cluster of culture-specific content genes, both the first cluster of culture-specific content genes and the second cluster of culture-specific content genes being associated with the individual geographical region; and based on the determining of the degree of overlap, associating the first media asset with the second media asset for media asset recommendations in the individual geographical region.

* * * * *